(12) United States Patent
Krishnan et al.

(10) Patent No.: US 12,534,707 B2
(45) Date of Patent: Jan. 27, 2026

(54) METHOD FOR GENERATING CARDIAC TISSUE MIMETICS

(71) Applicant: GENOME BIOLOGICS UG, Frankfurt am Main (DE)

(72) Inventors: Jaya Krishnan, Kronberg im Taunus (DE); Minh Duc Pham, Offenbach (DE); Stefanie Dimmeler, Frankfurt am Main (DE)

(73) Assignee: GENOME BIOLOGICS UG, Frankfurt am Main (DE)

( * ) Notice: Subject to any disclaimer, the term of this patent is extended or adjusted under 35 U.S.C. 154(b) by 944 days.

(21) Appl. No.: 17/626,509

(22) PCT Filed: Jul. 10, 2020

(86) PCT No.: PCT/EP2020/069641
§ 371 (c)(1),
(2) Date: Jan. 12, 2022

(87) PCT Pub. No.: WO2021/009070
PCT Pub. Date: Jan. 21, 2021

(65) Prior Publication Data
US 2022/0275336 A1    Sep. 1, 2022

(30) Foreign Application Priority Data

Jul. 12, 2019 (EP) .................................... 19186148
Mar. 25, 2020 (EP) .................................... 20165544

(51) Int. Cl.
*C12N 5/077* (2010.01)
*A61L 27/38* (2006.01)
*C12N 5/071* (2010.01)
*G01N 33/50* (2006.01)

(52) U.S. Cl.
CPC ........ *C12N 5/0657* (2013.01); *A61L 27/3834* (2013.01); *C12N 5/0697* (2013.01); *G01N 33/5061* (2013.01); *A61L 2430/20* (2013.01); *C12N 2502/1323* (2013.01); *C12N 2513/00* (2013.01)

(58) Field of Classification Search
CPC ............... C12N 5/0657; C12N 5/0697; C12N 2502/1323; C12N 2513/00; A61L 27/3834; A61L 2430/20; G01N 33/5061
See application file for complete search history.

(56) References Cited

U.S. PATENT DOCUMENTS

2016/0022870 A1* 1/2016 Noguchi .................. A61P 9/00
156/60

FOREIGN PATENT DOCUMENTS

| CN | 105849253 | 8/2016 |
| EP | 2974751 | 1/2016 |
| WO | 2017090777 | 6/2017 |
| WO | 2020014212 | 1/2020 |

OTHER PUBLICATIONS

Leoni A. Kunz-Schughart et al, "Potential of fibroblasts to regulate the formation of three-dimensional vessel-like structures from endothelial cells in vitro", American Journal of Physiology. Cell Physiology., vol. 290, No. 5, May 1, 2006 (May 1, 2006), p. C1385-C1398.
Brian C. Jensen et al. "Alpha-1-Adrenergic Receptors: Targets for Agonist Drugs to Treat Heart Failure", J Mol Cell Cardiol. Oct. 2011 ; 51(4): 518-528.

* cited by examiner

*Primary Examiner* — Tracy Vivlemore
*Assistant Examiner* — Eric J Rogers
(74) *Attorney, Agent, or Firm* — JMB Davis Ben-David

(57) ABSTRACT

The invention relates to a method for generating a cardiac tissue mimetic, comprising the steps of mixing cardiomyocytes (CM) and fibroblasts (FB) at a ratio from 2.5:1 to 10:1, thereby providing a first mixture, incubating said first mixture, such that said cardiomyocytes and said fibroblasts form a spherical structure, adding endothelial cells (EC) to said spherical structure at a ratio of cardiomyocytes (CM) to endothelial cells (EC) from 1.5:1 to 4:1, thereby providing a second mixture, and incubating said second mixture, such that a cardiac tissue mimetic is formed.

The invention further relates to a cardiac tissue mimetic comprising cardiomyocytes (CM), endothelial cells (EC), and fibroblasts (FB), wherein said cardiac tissue mimetic comprises sarcomeric structures and vascular structures.

Further aspects of the invention are the cardiac tissue mimetic for use in a method for heart tissue repair or replacement and a method for screening a compound using a cardiac tissue mimetic.

7 Claims, 20 Drawing Sheets

Specification includes a Sequence Listing.

B

α-Actinin

METHOD FOR GENERATING CARDIAC TISSUE MIMETICS

CROSS-REFERENCE TO RELATED APPLICATIONS

This is the U.S. National Stage of International Patent Application No. PCT/EP2020/069641 filed on Jul. 10, 2020, which in turn claims the benefit of European Patent application Ser. No. 19/186,148.3 filed on Jul. 12, 2019; and European Patent Application No. 20165544.6 filed on Mar. 25, 2020.

The present invention relates to a method for generating a cardiac tissue mimetic, a cardiac tissue mimetic and the cardiac tissue mimetic for use in a method for heart tissue repair or heart tissue replacement.

BACKGROUND OF THE INVENTION

Cardiac tissue engineering promises to create therapeutic tissue replacements for repair of the diseased native myocardium and as an ethical non-animal alternative for drug testing. Cardiac tissue mimetics could serve as an immediate alternative to monoculture 2D systems as a more precise context for drug testing and validation. In the longer term, such tissue mimetics could serve as an autologous tissue source for the replacement and repair of damaged heart tissue.

However, currently available tissue models and tissue mimetics fail to accurately mimic human myocardial responses to stress stimulation at the molecular, biochemical and physiologic level.

Based on the above-mentioned state of the art, the objective of the present invention is to provide means and methods to provide a tissue mimetic which more closely resembles native myocardial tissue, particularly in its ability to mimic stress response. This objective is attained by the subject-matter of the independent claims of the present specification.

SUMMARY OF THE INVENTION

A first aspect of the invention relates to a method for generating a cardiac tissue mimetic, comprising the steps of
a. providing cardiomyocytes,
b. providing fibroblasts,
c. mixing the cardiomyocytes and the fibroblasts at a ratio from 2.5:1 to 10:1, thereby providing a first mixture,
d. incubating the first mixture, such that the cardiomyocytes and the fibroblasts form a spherical structure,
e. adding endothelial cells to the spherical structure at a ratio from 1.5:1 to 4:1, thereby providing a second mixture,
f. incubating the second mixture, such that a cardiac tissue mimetic is formed.

A second aspect of the invention relates to a cardiac tissue mimetic comprising cardiomyocytes, endothelial cells, and fibroblasts, wherein the cardiac tissue mimetic comprises sarcomeric structures, and wherein the cardiac tissue mimetic comprises vascular structures.

A third aspect of the invention relates to a cardiac tissue mimetic according to the second aspect of the invention for use in a method for heart tissue repair or heart tissue replacement.

A fourth aspect of the invention relates to a method for screening a compound using a cardiac tissue mimetic according to the second aspect of the invention, wherein the cardiac tissue mimetic is exposed to the compound, and wherein growth, a contraction frequency, a contraction amplitude, an oxygen consumption rate, an average length of vascular sprouts and/or a number of vascular branch points of the cardiac tissue mimetic is measured to determine an effect of the compound on the cardiac tissue mimetic.

Advantageously, the described method is able to generate cardiac tissue mimetics which mimic responses to stress of native heart tissue at the molecular, biochemical and physiological level. These can be applied for therapy of heart diseases or for screening of compounds.

DETAILED DESCRIPTION OF THE INVENTION

Terms and Definitions

Figure 1:
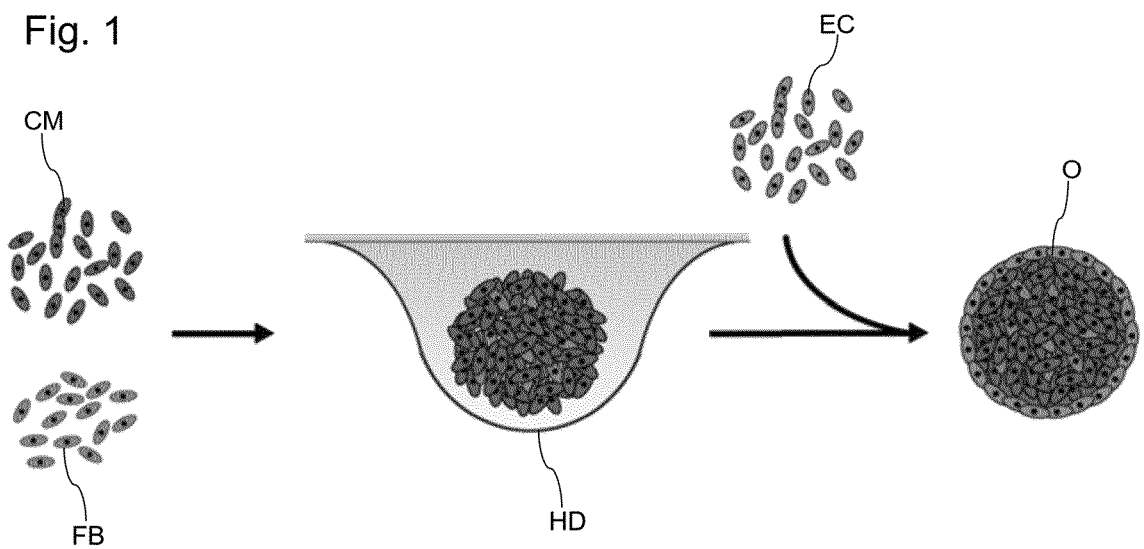
FIG. 1 shows a schematic of an example of the method according to the invention to obtain cardiac tissue mimetics using human cells.

Unless defined otherwise, all technical and scientific terms used herein have the same meaning as commonly understood by one of ordinary skill in the art (e.g., in cell culture, molecular genetics, nucleic acid chemistry, hybridization techniques and biochemistry). Standard techniques are used for molecular, genetic and biochemical methods (see generally, Sambrook et al., Molecular Cloning: A Laboratory Manual, 2d ed. (1989) Cold Spring Harbor Laboratory Press, Cold Spring Harbor, N.Y. and Ausubel et al., Short Protocols in Molecular Biology (1999) 4th Ed, John Wiley & Sons, Inc.) and chemical methods.

The term "a subject comprises an object" in the context of the present specification includes discrete embodiments where the subject consists of the object, in other words where the term comprise is synonymous with "consist of". In other discrete embodiments, the object is one of several different comprised in the object.

The term cardiac tissue mimetic (also designated as 'CTM' throughout this specification) in the context of the present specification relates to an artificial three dimensional structure comprising cells occurring in heart tissue of a human or an animal, wherein the artificial three dimensional structure mimics responses to stress of native heart tissue of the human or the animal, particularly responses to stress at the molecular, biochemical and/or physiological level.

The term cardiomyocyte (abbreviated as 'CM' throughout this specification) in the context of the present specification is used in the meaning known in the art of cell biology and relates to human or animal heart muscle cells.

The term fibroblast (abbreviated as 'FB' throughout this specification) in the context of the present specification is used in the meaning known in the art of cell biology and relates to human or animal cells of the connective tissue, particularly cells synthesizing extracellular matrix, more particularly collagen. This definition includes cardiac fibroblasts among other types of fibroblasts.

The term endothelial cell (abbreviated as 'EC' throughout this specification) in the context of the present specification is used in the meaning known in the art of cell biology and relates to human or animal cells capable of lining an interior surface of a blood vessel or a lymphatic vessel.

The term HUVEC (or HUVECs) in the context of the present specification designates human umbilical vein endothelial cells.

The term human induced pluripotent stem cells (abbreviated 'rhiPS' throughout this specification) in the context of the present specification is used in the meaning known in the art of cell biology and relates to pluripotent stem cells derived from non-pluripotent somatic cells by artificial reprogramming. Therein, the term pluripotent means that the cells are capable of differentiating into cells of the ectoderm, entoderm and mesoderm and the germ line, but cannot form a whole organism.

The term spherical structure in the context of the present specification relates to a three dimensional structure having the shape of a sphere, an ellipsoid or an ovoid.

The term contractile ability in the context of the present specification relates to the ability of a spherical structure of cells or a cardiac tissue mimetic to periodically change their shape and/or spatial dimensions, particularly spontaneously or when electrically paced by applying an electric field to the spherical structure or cardiac tissue mimetic.

The term sarcomeric structure in the context of the present specification is used in the meaning known in the art of cell biology and relates to a structure comprising at least one sarcomere, the basic unit of striated muscle cells, wherein particularly the sarcomeric structure is a myofibril. In particular, sarcomeric structures can be visualized by staining cells using antibodies against α-actinin and fluorescence microscopy.

The term vascular structure in the context of the present specification is used in the meaning known in the art of cell biology and relates to a blood vessel or lymphatic vessel or a structure observed during development or growth of blood vessels or lymphatic vessels, such as a vascular sprout, a vascular plexus or a vascular branch point.

The term vascular sprout in the context of the present specification is used in the meaning known in the art of cell biology and relates to a portion of a blood vessel or lymphatic vessel that extends to form a new blood vessel or lymphatic vessel.

The term vascular plexus in the context of the present specification is used in the meaning known in the art of cell biology and relates to a network of blood vessels or lymphatic vessels.

The term vascular branch point in the context of the present specification is used in the meaning known in the art of cell biology and relates to a point, where a blood vessel or lymphatic vessel branches off from another blood vessel or lymphatic vessel.

The term contraction frequency in the context of the present specification designates a number of contractions of a structure per unit of time. Therein, the term contraction describes a reduction of the physical extension of the structure in at least one direction in space.

The term contraction amplitude in the context of the present specification designates the difference in physical extension between a contracted and a non-contracted (or expanded) state in a given direction in space.

The term oxygen consumption rate in the context of the present specification designates an amount (e.g. a weight or a volume) of oxygen ($O_2$) used up per unit of time.

The term extracellular acidification rate in the context of the present specification designates a decrease in pH per unit of time outside of cells.

The term adrenergic receptor agonist in the context of the present specification is used in the meaning known in the art of cell biology and relates to a substance which specifically binds to and activates an adrenergic receptor. Therein, the term adrenergic receptor describes a G protein-coupled receptor capable of being activated by adrenalin and/or noradrenalin, particularly wherein the term adrenergic receptor includes a α-adrenergic receptor, such as α1 adrenergic receptor or α2 adrenergic receptor, and a β-adrenergic receptor.

The term endothelial-mesenchymal transition in the context of the present specification is used in the meaning known in the art of cell biology and relates to the transition of epithelial cells into cells having mesenchymal properties, particularly wherein the mesenchymal properties include the ability to migrate.

The term collagen deposition in the context of the present specification designates an accumulation of extracellular matrix comprising a collagen.

The term cardiac fibrosis in the context of the present specification designates an increased deposition of extracellular matrix, particularly collagen, in cardiac tissue.

The term phenylephrine (also designated as 'PE' throughout this specification) in the context of the present specification designates the compound having the CAS-No. 59-42-7, which is an agonist of the α1 adrenoreceptor.

The term DAPI in the context of the present specification designates the compound 4',6-Diamidin-2-phenylindol having the CAS-No. 28718-90-3.

The term Hoechst 33342 in the context of the present specification designates the compound 2'-(4-Ethoxyphenyl)-5-(4-methyl-1-piperazinyl)-2,5'-bi-1H-benzimidazol trihydrochloride having the CAS No. 23491-52-3.

The term TGF β2 in the context of the present specification relates to a protein having at least 80%, particularly at least 85%, more particularly at least 90%, even more particularly at least 95%, even more particularly at least 99% sequence identity to human TGF β1 (UniProtKB P01137) having the sequence (SEQ ID 1)
'MPPSGLRLLLLLLPLLWLLVLTPGRPAAGLSTCKTIDMELVKRKRIEA

IRGQILSKLRLASPPSQGEVPPGPLPEAVLALYNSTRDRVAGESAEPEP

EPEADYYAKEVTRVLMVETHNEIYDKFKQSTHSIYMFFNTSELREAVPE

PVLLSRAELRLLRLKLKVEQHVELYQKYSNNSWRYLSNRLLAPSDSPEW

LSFDVTGVVRQWLSRGGEIEGFRLSAHCSCDSRDNTLQVDINGFTTGRR

GDLATIHGMNRPFLLLMATPLERAQHLQSSRHRRALDTNYCFSSTEKNC

CVRQLYIDFRKDLGWKWIHEPKGYHANFCLGPCPYIWSLDTQYSKVLAL

YNQHNPGASAAPCCVPQALEPLPIVYYVGRKPKVEQLSNMIVRSCKCS' or rat TGF β1 (UniProtKB P17246) having the sequence (SEQ ID 2)
'MPPSGLRLLPLLLPLPWLLVLTPGRPAAGLSTCKTIDMELVKRKRIEA

IRGQILSKLRLASPPSQGEVPPGPLPEAVLALYNSTRDRVAGESADPEP

EPEADYYAKEVTRVLMVDRNNAIYDKTKDITHSIYMFFNTSDIREAVPE

PPLLSRAELRLQRFKSTVEQHVELYQKYSNNSWRYLGNRLLTPTDTPEW

LSFDVTGVVRQWLNQGDGIQGFRFSAHCSCDSKDNVLHVEINGISPKRR

GDLGTIHDMNRPFLLLMATPLERAQHLHSSRHRRALDTNYCFSSTEKNC

CVRQLYIDFRKDLGWKWIHEPKGYHANFCLGPCPYIWSLDTQYSKVLAL

YNQHNPGASASPCCVPQALEPLPIVYYVGRKPKVEQLSNMIVRSCKCS'.

The term Isolectin B4 in the context of the present specification relates to a protein having at least 80%, particularly at least 85%, more particularly at least 90%, even more particularly at least 95%, even more particularly at least 99% sequence identity to *Griffonia simplicifolia* GSI-B4 isolectin (UniProtKB Q8W1R6), having the sequence (SEQ ID 3)
'NFWSDVEDSIIFQGDANTTAGTLQLCKTNQYGTPLQWSAGRALYSDPV

QLWDNKTESVASFYTEFTFFLKITGNGPADGLAFFLAPPDSDVKDAGEY

LGLFNKSTATQPSKNQVVAVEFDTWTNPNFPEPSYRHIGINVNSIVSVA

TKRWEDSDIFSGKIATARISYDGSAEILTVVLSYPDGSDYILSHSVDMR

QNLPESVRVGISASTGNNQFLTVYILSWRFSSNLQSTSVKAAMEPEITR

TVV'

The term SM22α in the context of the present specification relates to a protein having at least 80%, particularly at least 85%, more particularly at least 90%, even more particularly at least 95%, even more particularly at least 99% sequence identity to human SM22 (UniProt KB Q01995), having the sequence (SEQ ID 4)
'MANKGPSYGMSREVQSKIEKKYDEELEERLVEWIIVQCGPDVGRPDRG

RLGFQVWLKNGVILSKLVNSLYPDGSKPVKVPENPPSMVFKQMEQVAQ

FLKAAEDYGVIKTDMFQTVDLFEGKDMAAVQRTLMALGSLAVTKNDGHY

RGDPNWFMKKAQEHKREFTESQLQEGKHVIGLQMGSNRGASQAGMTGYG

RPRQIIS'.

The term vascular endothelial growth factor (abbreviated 'VEGF' throughout this specification) designates a protein having at least 80%, particularly at least 85%, more particularly at least 90%, even more particularly at least 95%, even more particularly at least 99% sequence identity to human Vascular endothelial growth factor C (UniProt KB P49767) having the sequence (SEQ ID 5)
'MHLLGFFSVACSLLAAALLPGPREAPAAAAAFESGLDLSDAEPDAGEA

TAYASKDLEEQLRSVSSVDELMTVLYPEYWKMYKCQLRKGGWQHNREQA

NLNSRTEETIKFAAAHYNTEILKSIDNEWRKTQCMPREVCIDVGKEFGV

ATNTFFKPPCVSVYRCGGCCNSEGLQCMNTSTSYLSKTLFEITVPLSQG

PKPVTISFANHTSCRCMSKLDVYRQVHSIIRRSLPATLPQCQAANKTCP

TNYMWNNHICRCLAQEDFMFSSDAGDDSTDGFHDICGPNKELDEETCQC

VCRAGLRPASCGPHKELDRNSCQCVCKNKLFPSQCGANREFDENTCQCV

CKRTCPRNQPLNPGKCACECTESPQKCLLKGKKFHHQTCSCYRRPCTNR

QKACEPGFSYSEEVCRCVPSYWKRPQMS'.

Sequences similar or homologous (e.g., at least about 70% sequence identity) to the sequences disclosed herein are also part of the invention. In some embodiments, the sequence identity at the amino acid level can be about 80%, 85%, 90%, 91%, 92%, 93%, 94%, 95%, 96%, 97%, 98%, 99% or higher. At the nucleic acid level, the sequence identity can be about 70%, 75%, 80%, 85%, 90%, 91%, 92%, 93%, 94%, 95%, 96%, 97%, 98%, 99% or higher. Alternatively, substantial identity exists when the nucleic acid segments will hybridize under selective hybridization conditions (e.g., very high stringency hybridization conditions), to the complement of the strand. The nucleic acids may be present in whole cells, in a cell lysate, or in a partially purified or substantially pure form.

Calculations of "homology" or "sequence identity" or "similarity" between two sequences (the terms are used interchangeably herein) are performed as follows. The sequences are aligned for optimal comparison purposes (e.g., gaps can be introduced in one or both of a first and a second amino acid or nucleic acid sequence for optimal alignment and non-homologous sequences can be disregarded for comparison purposes). In a particular embodiment, the length of a reference sequence aligned for comparison purposes is at least 30%, particularly at least 40%, more particularly at least 50%, even more particularly at least 60%, and even more particularly at least 70%, 80%, 90%, 100% of the length of the reference sequence. The amino acid residues or nucleotides at corresponding amino acid positions or nucleotide positions are then compared. When a position in the first sequence is occupied by the same amino acid residue or nucleotide as the corresponding position in the second sequence, then the molecules are identical at that position (as used herein amino acid or nucleic acid "homology" is equivalent to amino acid or nucleic acid "identity"). The percent identity between the two sequences is a function of the number of identical positions shared by the sequences, taking into account the number of gaps, and the length of each gap, which need to be introduced for optimal alignment of the two sequences. In the case of circularly related proteins, the sequence of one of the partners needs to be appropriately split and aligned in two sections to achieve optimal alignment of the functionally equivalent residues necessary to calculate the percent identity.

In the context of the present specification, the terms sequence identity and percentage of sequence identity refer to the values determined by comparing two aligned sequences. Methods for alignment of sequences for comparison are well-known in the art. Alignment of sequences for comparison may be conducted by the local homology algorithm of Smith and Waterman, 1981, Adv. Appl. Math., 2, 482, by the global alignment algorithm of Needleman and Wunsch, 1970, J. Mol. Biol., 48, 443, by the search for similarity method of Pearson and Lipman, 1988, Proc. Nat. Acad. Sci., 85, 2444 or by computerized implementations of these algorithms, including, but not limited to: CLUSTAL, GAP, BESTFIT, BLAST, FASTA and TFASTA. Software for performing BLAST analyses is publicly available, e.g., through the National Center for Biotechnology-Information (http://blast.ncbi.nlm.nih.gov/).

One example for comparison of amino acid sequences is the BLASTP algorithm that uses the default settings: Expect threshold: 10; Word size: 3; Max matches in a query range: 0; Matrix: BLOSUM62; Gap Costs: Existence 11, Extension 1; Compositional adjustments: Conditional compositional score matrix adjustment. One such example for comparison of nucleic acid sequences is the BLASTN algorithm that uses the default settings: Expect threshold: 10; Word size: 28; Max matches in a query range: 0; Match/Mismatch Scores: 1.-2; Gap costs: Linear. Unless stated otherwise, sequence identity values provided herein refer to the value obtained using the BLAST suite of programs (Altschul et al., 1990, J. Mol. Biol., 215, 403-410) using the above identified default parameters for protein and nucleic acid comparison, respectively.

A first aspect of the invention relates to a method for generating a cardiac tissue mimetic comprising the steps of providing cardiomyocytes, providing fibroblasts, mixing the cardiomyocytes and the fibroblasts at a ratio of cardiomyocytes to fibroblasts from 2.5:1 to 10:1, thereby providing a first mixture, incubating the first mixture, such that the cardiomyocytes and the fibroblasts form a spherical structure, adding endothelial cells to the spherical structure at a ratio of cardiomyocytes to endothelial cells from 1.5:1 to 4:1, thereby providing a second mixture, and incubating the second mixture, such that a cardiac tissue mimetic, particularly according to the second aspect of the invention, is formed.

In certain embodiments of the method, the cardiomyocytes and the fibroblasts are mixed at a ratio of 4:1 to 6:1, particularly 5:1, of cardiomyocytes to fibroblasts.

In certain embodiments of the method, the endothelial cells are added to the spherical structure at a ratio of 1.5:1 to 3:1, particularly 2:1, of cardiomyocytes (CM) to endothelial cells (EC).

In certain embodiments, the fibroblasts (FB) are trypsinized prior to mixing with the cardiomyocytes.

In certain embodiments, the first mixture is incubated at 35° C. to 39° C., particularly 37° C.

In certain embodiments, the first mixture is incubated for 3 days to 6 days, particularly 4 days.

In certain embodiments, the first mixture is incubated in a medium promoting growth and/or plating of the cardiomyocytes, particularly iCell® Cardiomyocytes plating medium (CDi-Fujifilm).

In certain embodiments, the first mixture is cultured as a hanging drop, wherein particularly the volume of the hanging drop is 10 µl to 100 µl, more particularly 20 µl to 50 µl, even more particularly about 30 µl.

In certain embodiments, the density of the cardiomyocytes is 5000 cells per drop.

In certain embodiments, the density of the fibroblasts is 100 cells per drop.

In certain embodiments of the method, the spherical structure comprises a diameter of 50 µm to 1 mm, particularly 100 µm to 500 µm, more particularly 200 µm to 300 µm.

In certain embodiments of the method, the spherical structure displays contractile ability characterized by at least 10 beats per minute and/or a contraction amplitude of at least 7 µm, particularly at least 9 µm, particularly when electrically paced, more particularly at a pacing frequency of 1 Hz and a pacing voltage of 15 V.

In certain embodiments of the method, the cardiac tissue mimetic comprises sarcomeres, particularly characterized by an average sarcomere length of at least 2 µm.

In certain embodiments of the method, the cardiac tissue mimetic comprises vascular structures, particularly characterized by an average length of at least 200 µm.

In certain embodiments of the method, a plurality of spherical structures is obtained by mixing cardiomyocytes and fibroblasts at a ratio of cardiomyocytes to fibroblasts from 2.5:1 to 10:1, thereby providing a first mixture, and incubating the first mixture, wherein the spherical structures are separated from each other, and wherein the endothelial cells are added to the separated spherical structures to form the second mixture.

In certain embodiments, the spherical structures are incubated separately in a medium promoting growth of the cardiomyocytes, particularly iCell® Cardiomyocytes maintenance medium (CDi-Fujifilm) prior to adding the endothelial cells. In particular, the medium is changed every two days.

In certain embodiments of the method, the spherical structure is coated with at least one extracellular matrix component prior to adding the endothelial cells. In particular, the spherical structure is coated with fibronectin or Matrigel®, particularly growth factor reduced Matrigel®.

In certain embodiments, a plurality of cardiac tissue mimetics are obtained according to the method of the invention, wherein the cardiac tissue mimetics are incubated separately for 5 days to 14 days, particularly 7 days, prior to adding the endothelial cells.

In certain embodiments, a plurality of cardiac tissue mimetics are obtained according to the method of the invention, wherein the cardiac tissue mimetics are incubated separately in wells of ultra-low-attachment plates prior to adding the endothelial cells.

In certain embodiments of the method, the spherical structures are incubated for 2 hours to 14 days, particularly about 7 days, prior to adding the endothelial cells.

In certain embodiments of the method, the first mixture is incubated as a hanging drop culture, particularly at 35° C. to 39° C., more particularly 37° C.

In certain embodiments of the method, the first mixture is incubated for 3 days to 6 days, particularly about 4 days.

In certain embodiments of the method, the second mixture is incubated in an ultra-low attachment plate, particularly at 35° C. to 39° C., more particularly 37° C.

In certain embodiments, the second mixture is incubated in a mixture, particularly a 1:1 mixture, of a medium promoting growth of cardiomyocytes, particularly maintenance medium and a medium promoting growth of endothelial cells, particularly endothelial cell growth medium, wherein particularly half of the mixture of the medium promoting growth of cardiomyocytes and the medium promoting growth of endothelial is changed every second day.

In certain embodiments, the second mixture is incubated for 8 days to 30 days, particularly 10 days, wherein particularly the second mixture is incubated at 35° C. to 39° C., more particularly 37° C.

In certain embodiments, the second mixture is incubated at 35° C. to 39° C., particularly 37° C.

In certain embodiments of the method, the cardiomyocytes, the fibroblasts and/or the endothelial cells are human cells or rat cells.

In certain embodiments of the method, the cardiomyocytes are genetically modified.

In certain embodiments of the method, the fibroblasts are genetically modified.

In certain embodiments of the method, the endothelial cells are genetically modified.

In certain embodiments of the method, the cardiomyocytes (CM) and/or the endothelial cells (EC) are differentiated from stem cells, particularly induced pluripotent stem cells, more particularly human induced pluripotent stem cells (hiPS).

The pluripotent stem cells may be derived from human or animal cells. Furthermore, the pluripotent stem cells may be obtained by reprogramming human or animal cells.

A second aspect of the invention relates to a cardiac tissue mimetic, particularly obtained by a method according to the first aspect of the invention, comprising cardiomyocytes, endothelial cells and fibroblasts, wherein the cardiac tissue mimetic comprises sarcomeres and vascular structure. In particular, the sarcomeric structures are characterized by an average sarcomere length of at least 2 µm. In particular, the vascular structures are characterized by an average length of at least 200 µm.

In certain embodiments of the cardiac tissue mimetic, the cardiac tissue mimetic has a spherical shape.

In certain embodiments of the cardiac tissue mimetic, the spherical shape comprises a diameter of 50 µm to 1 mm, particularly 100 µm to 500 µm, more particularly 200 µm to 300 µm.

In certain embodiments of the cardiac tissue mimetic, the cardiomyocytes are human cells or animal cells, particularly rat cells, horse cells, dog cells, or cat cells.

In certain embodiments of the cardiac tissue mimetic, the fibroblasts are human cells or animal cells, particularly rat cells, horse cells, dog cells or cat cells.

In certain embodiments of the cardiac tissue mimetic, the endothelial cells are human cells or animal cells, particularly rat cells, horse cells, dog cells or cat cells.

In certain embodiments, the cardiomyocytes, the fibroblasts and/or the endothelial cells are from human or animal origin.

In certain embodiments of the cardiac tissue mimetic, the cardiomyocytes are differentiated from induced pluripotent stem cells, particularly human induced pluripotent stem cells.

In certain embodiments of the cardiac tissue mimetic, the endothelial cells are differentiated from induced pluripotent stem cells, particularly human induced pluripotent stem cells.

In certain embodiments of the cardiac tissue mimetic, the fibroblasts are differentiated from induced pluripotent stem cells, particularly human induced pluripotent stem cells.

In certain embodiments of the cardiac tissue mimetic, the cardiac tissue mimetic comprises at least one sarcomeric structure.

In certain embodiments of the cardiac tissue mimetic, the cardiac tissue mimetic comprises at least one vascular structure.

In certain embodiments of the cardiac tissue mimetic, the cardiac tissue mimetic mimics human myocardial responses to stress simulation at the molecular, biochemical and physiologic level.

In certain embodiments of the cardiac tissue mimetic, the cardiomyocytes and the endothelial cells are from the same species.

In certain embodiments of the cardiac tissue mimetic, the cardiomyocytes and the fibroblasts are from the same species.

In certain embodiments of the cardiac tissue mimetic, the fibroblasts and the endothelial cells are from the same species.

In certain embodiments of the cardiac tissue mimetic, the cardiomyocytes, the endothelial cells and the fibroblasts are from the same species.

In certain embodiments of the cardiac tissue mimetic, the cardiomyocytes and the endothelial cells are from different species.

In certain embodiments of the cardiac tissue mimetic, the cardiomyocytes and the fibroblasts are from different species.

In certain embodiments of the cardiac tissue mimetic, the fibroblasts and the endothelial cells are from different species.

In certain embodiments of the cardiac tissue mimetic, the cardiomyocytes, the endothelial cells and the fibroblasts are from different species.

In certain embodiments of the cardiac tissue mimetic, the cardiomyocytes are genetically modified.

In certain embodiments of the cardiac tissue mimetic, the endothelial cells are genetically modified.

In certain embodiments of the cardiac tissue mimetic, the fibroblasts are genetically modified.

In certain embodiment of the cardiac tissue mimetic, growth of the cardiac tissue mimetic is inducible, or the volume of the cardiac tissue mimetic, an average number of sarcomeres per cardiomyocyte, an average volume of cardiomyocytes, a contraction frequency, a contraction amplitude, an oxygen consumption rate, an average number of mitochondria per cell, an average length of vascular sprouts, an average thickness of vascular sprouts and/or a number of vascular branch points of the cardiac tissue mimetic is increasable or an extracellular acidification rate of the cardiac tissue mimetic is decreasable a by an adrenergic receptor agonist, particularly an α-adrenergic receptor agonist, more particularly phenylephrine, most particularly at a concentration of at least 200 μM.

In certain embodiments of the cardiac tissue mimetic, growth of the cardiac tissue mimetic is inducible by an adrenergic receptor agonist, particularly an α-adrenergic receptor agonist, more particularly phenylephrine, most particularly at a concentration of at least 200 μM.

In certain embodiments of the cardiac tissue mimetic, the volume of the cardiac tissue mimetic is increasable by an adrenergic receptor agonist, particularly an α-adrenergic receptor agonist (more particularly phenylephrine, most particularly at a concentration of at least 200 μM), particularly by a factor of at least 2 after 10 days of cultivation compared to a culture lacking the α-adrenergic receptor agonist.

In certain embodiments of the cardiac tissue mimetic, the average number of sarcomeres per cardiomyocyte is increasable by an adrenergic receptor agonist, particularly an α-adrenergic receptor agonist (more particularly phenylephrine, most particularly at a concentration of at least 200 μM), particularly by a factor of at least 2 after 10 days of cultivation compared to a culture lacking the adrenergic receptor agonist.

In certain embodiments of the cardiac tissue mimetic, the average volume of cardiomyocytes in the cardiac tissue mimetic is increasable by an adrenergic receptor agonist, particularly an α-adrenergic receptor agonist (more particularly phenylephrine, most particularly at a concentration of at least 200 μM), particularly by a factor of at least 2 after 10 days of cultivation compared to a culture lacking the α-adrenergic receptor agonist.

In certain embodiments of the cardiac tissue mimetic, a contraction frequency of the cardiac tissue mimetic is increasable by an adrenergic receptor agonist, particularly an α-adrenergic receptor agonist, more particularly phenylephrine, most particularly at a concentration of at least 200 μM.

In certain embodiments of the cardiac tissue mimetic, a contraction amplitude of the cardiac tissue mimetic, particularly when electrically paced, more particularly at a pacing frequency of 1 Hz and a pacing voltage of 15 V, is increasable by an adrenergic receptor agonist, particularly an α-adrenergic receptor agonist (more particularly phenylephrine, most particularly at a concentration of at least 200 μM), particularly by a factor of at least 2.

In certain embodiments of the cardiac tissue mimetic, an oxygen consumption rate of the cardiac tissue mimetic is increasable by an adrenergic receptor agonist, particularly an α-adrenergic receptor agonist (more particularly phenylephrine, most particularly at a concentration of at least 200 μM), particularly by a factor of at least 2.

In certain embodiments of the cardiac tissue mimetic, an extracellular acidification rate of the cardiac tissue mimetic is decreasable by an adrenergic receptor agonist, particularly an α-adrenergic receptor agonist (more particularly phenylephrine, most particularly at a concentration of at least 200 μM), particularly by a factor of at least 2.

In certain embodiments of the cardiac tissue mimetic, an average number of mitochondria per cell of the cardiac tissue mimetic is increasable by an adrenergic receptor agonist, particularly an α-adrenergic receptor agonist (more particularly phenylephrine, most particularly at a concentration of at least 200 µM), particularly by a factor of at least 2.

In certain embodiments of the cardiac tissue mimetic, an average length of vascular sprouts of the cardiac tissue mimetic is increasable by an adrenergic receptor agonist, particularly an α-adrenergic receptor agonist (more particularly phenylephrine, most particularly at a concentration of at least 200 µM), particularly by a factor of at least 2.

In certain embodiments of the cardiac tissue mimetic, an average thickness of vascular sprouts of the cardiac tissue mimetic is increasable by an adrenergic receptor agonist, particularly an α-adrenergic receptor agonist (more particularly phenylephrine, most particularly at a concentration of at least 200 µM), particularly by a factor of at least 2.

In certain embodiments of the cardiac tissue mimetic, a number of vascular branch points of the cardiac tissue mimetic is increasable by an adrenergic receptor agonist, particularly an α-adrenergic receptor agonist (more particularly phenylephrine, most particularly at a concentration of at least 200 µM), particularly by a factor of at least 2.

In certain embodiments of the cardiac tissue mimetic, an average length of vascular sprouts or collagen deposition of the cardiac tissue mimetic is increasable by an inducer of endothelial-mesenchymal transition and/or an inducer of cardiac fibrosis (particularly transforming growth factor β2, more particularly at a concentration of at least 10 ng/l), particularly by a factor of at least 2.

In certain embodiments of the cardiac tissue mimetic, an average length of vascular sprouts of the cardiac tissue mimetic is increasable by an inducer of endothelial-mesenchymal transition and/or an inducer of cardiac fibrosis (particularly transforming growth factor β2, more particularly at a concentration of at least 10 ng/l), particularly by a factor of at least 2.

In certain embodiments of the cardiac tissue mimetic, collagen deposition in the cardiac tissue mimetic is increasable by an inducer of endothelial-mesenchymal transition and/or an inducer of cardiac fibrosis (particularly transforming growth factor β2, more particularly at a concentration of at least 10 ng/l).

In certain embodiments of the cardiac tissue mimetic, an average length of vascular sprouts of the cardiac tissue mimetic is decreasable by hypoxia [0.1% v/v $O_2$ or less], particularly by a factor of at least 2.

A third aspect of the invention relates to a cardiac tissue mimetic according to the second aspect of the invention for use in a method for heart tissue repair or heart tissue replacement.

In certain embodiments of the cardiac tissue mimetic according to the third aspect, a cardiac tissue mimetic is injected into heart tissue.

In certain embodiments of the cardiac tissue mimetic according to the third aspect, a tissue graft is formed from a plurality of cardiac tissue mimetics according to the second aspect, wherein the tissue graft is implanted into heart tissue. In particular, the tissue graft further comprises native heart tissue. In particular, the tissue graft may be sutured into or onto the heart tissue.

The remarkable ability of the cardiac tissue mimetics according to the present invention to integrate into native heart tissue could be used to form larger tissue grafts or implants.

A fourth aspect of the invention relates to a method for screening a compound using a cardiac tissue mimetic according to the second aspect of the invention, wherein the cardiac tissue mimetic is exposed to the compound, and wherein growth, a contraction frequency, a contraction amplitude, an oxygen consumption rate, an average length of vascular sprouts and/or a number of vascular branch points of the cardiac tissue mimetic is measured to determine an effect of the compound on the cardiac tissue mimetic.

A fifth aspect of the invention relates to a tissue graft comprising a cardiac tissue mimetic according to the second aspect, particularly wherein the tissue graft further comprises native heart tissue from a human or animal.

A sixth aspect of the invention relates to a method for heart tissue repair or heart tissue replacement comprising implanting a cardiac tissue mimetic according to the second aspect or a tissue graft according to the fifth aspect into a human or animal heart.

In certain embodiments of the method, a cardiac tissue mimetic according to the second aspect is injected into heart tissue.

In certain embodiments of the method, a tissue graft according to the fifth aspect is implanted, particularly sutured into a human or animal heart.

Wherever alternatives for single separable features are laid out herein as "embodiments", it is to be understood that such alternatives may be combined freely to form discrete embodiments of the invention disclosed herein.

The invention is further illustrated by the following examples and figures, from which further embodiments and advantages can be drawn. These examples are meant to illustrate the invention but not to limit its scope.

Description of the Figures

FIG. 1 is a schematic of an example of the method according to the invention, wherein cardiomyocytes (CM) are co-cultured with fibroblasts (FB) in hanging drop (HD) cultures, and subsequently, endothelial cells (EC) are added until cardiac tissue mimetics (O) are formed.

Figure 2:
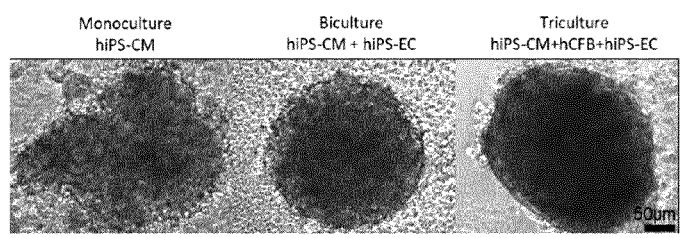
FIG. 2 shows microscopic images of cardiac tissue mimetics obtained by the method according to the invention.
Figure 2:
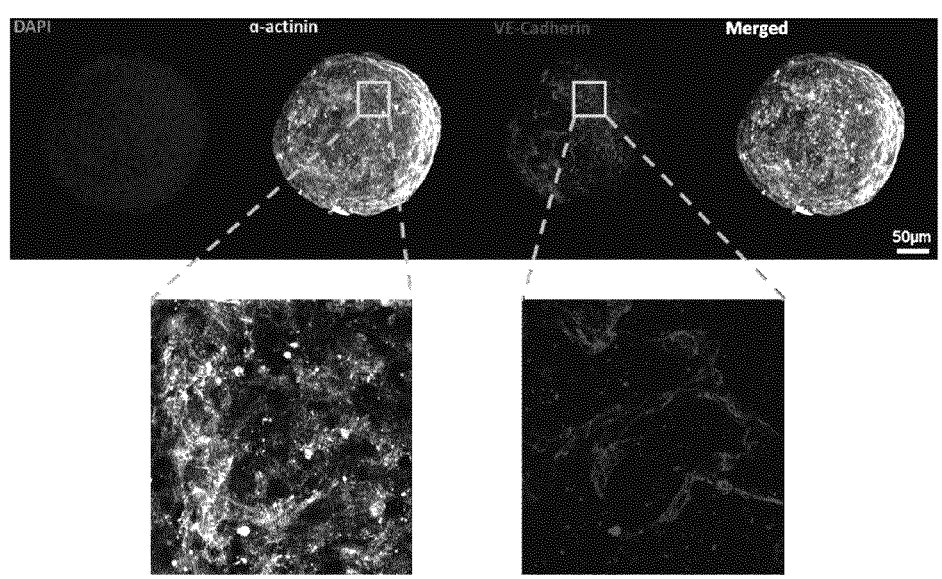

FIG. 2 shows microscopic images characterizing the cardiac tissue mimetics obtained by the method according to the invention. (A) Cardiac tissue mimetics were cultured as monoculture (only hiPS-CM), biculture (hiPS-CM+hiPS-EC) and triculture (hiPS-CM+hCFB+hiPS-EC) as indicated. (B) Tricultural cardiac tissue mimetics as in (A) were stained for DAPI (nuclei), α-actinin (CM marker) and VE-cadherin (EC marker) (B—upper panel) and imaged under high magnification to determine sarcomere structure and vascular network (B—lower panel).

FIGS. 3 to 12 display the establishment of a vascularized 3D cardiac tissue mimetic culture.

Figure 3:
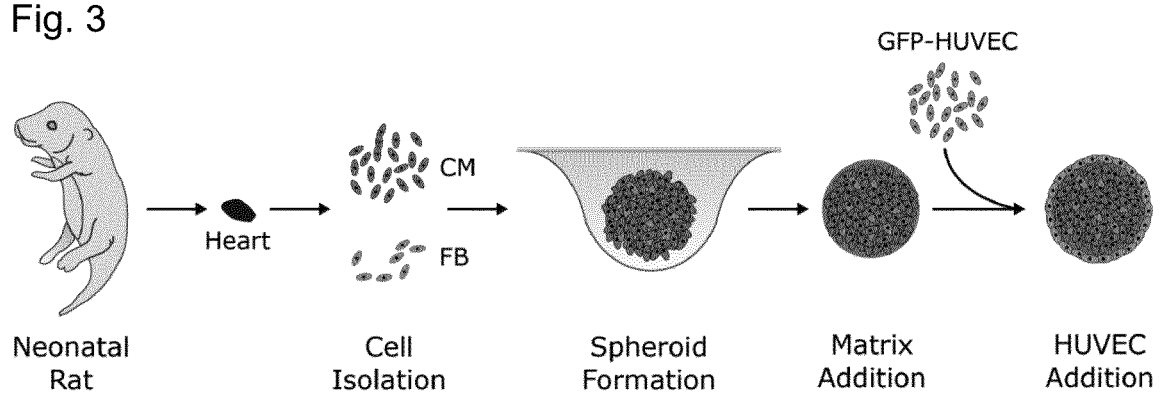
FIG. 3 shows a schematic of a further example of the method according to the invention to obtain cardiac tissue mimetics using rat cells.

FIG. 3 shows a schematic presentation of CTM formation. Cardiomyocytes (CM) and fibroblasts (FB) were isolated from neonatal rat hearts and cultured in hanging drops to allow spheroid formation. After 4 days, cardiac spheroids were harvested, matrix proteins were added to optimize cells adhesion and human umbilical vein endothelial cells (HUVEC) that had been transduced with green fluorescence protein (GFP) were seeded on top of the cardiac spheroid. CTMs were cultured for 10 days.

Figure 4:
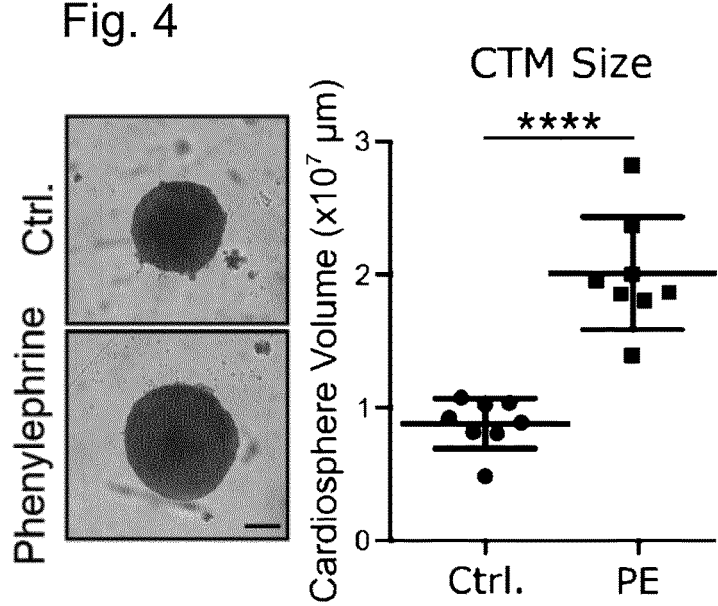
FIG. 4 shows the results of size measurements of cardiac tissue mimetics according to the invention.

FIG. 4 depicts the size of CTMs without treatment (control, Ctrl.) or treated for 10 days with 200 µM phenylephrine (PE). CTM size is shown as volume (scale bar=100 µm; n=8).

Figure 5:
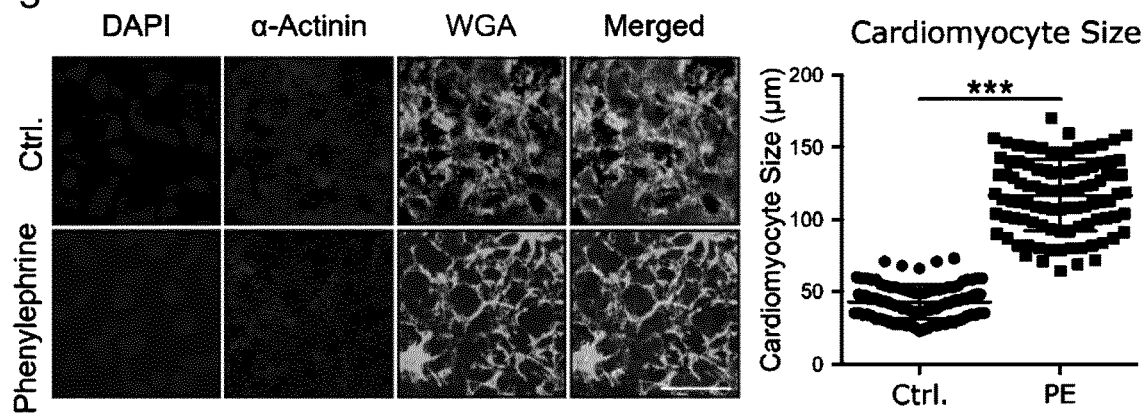
FIG. 5 shows microscopic pictures and size measurement results of cardiac tissue mimetics (CTMs) treated with phenylephrine (PE) compared to control tissue mimetics.

FIG. 5 shows the size of CM within CTMs cultured for 10 days under no PE or PE. CM were stained with WGA (green) and α-actinin (red). Nuclei were stained with DAPI (blue). Scale bar=20 µm (n=100 cells per condition).

Figure 6:
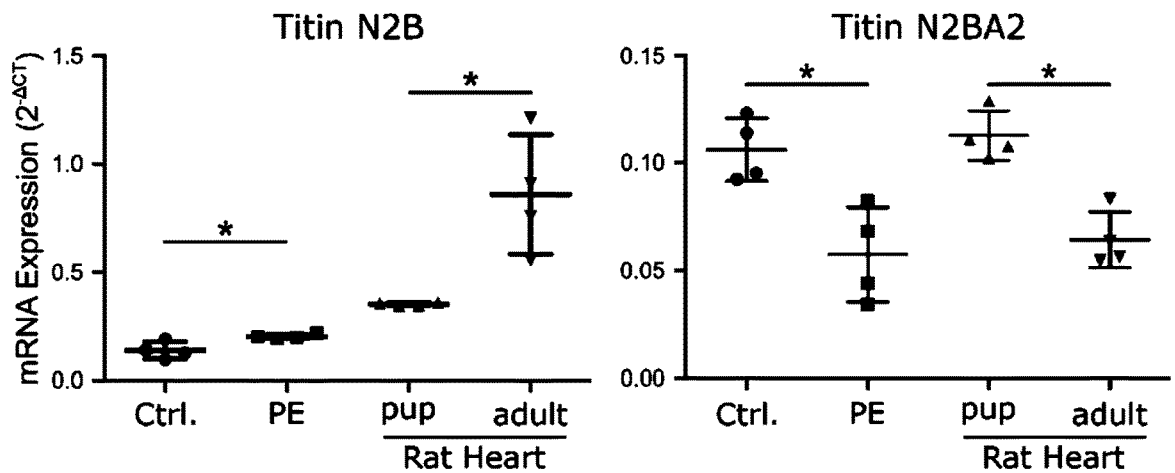
FIG. 6 shows mRNA expression of Titin N2B and N2BA2 in phenylephrine (PE)-treated cardiac tissue mimetics compared to control tissue mimetics.

FIG. 6 illustrates mRNA expression of Titin N2B and N2BA2 in control and PE-treated CTMs, as well as in whole hearts from postnatal (pup) and adult rats (n=4).

Figure 7:
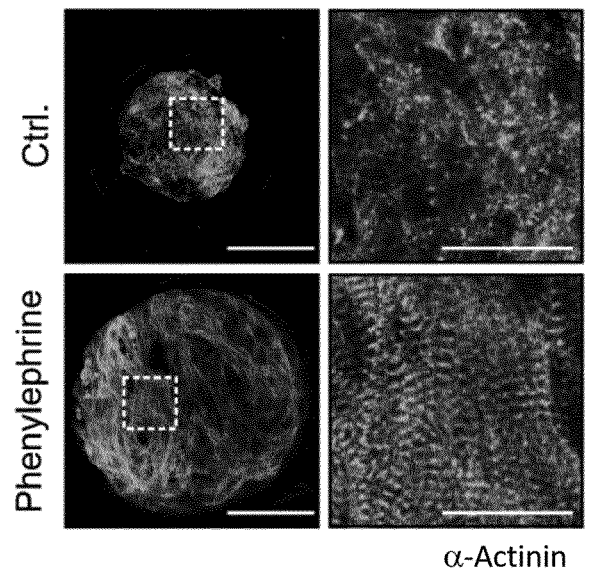
FIG. 7 shows microscopic immunofluorescence images of cardiac tissue mimetics treated with phenylephrine (PE) compared to control tissue mimetics.

FIG. 7 shows immunofluorescence imaging of CTMs cultured for 10 days with no PE (Ctrl.) or PE. Cardiomyocyte maturation was monitored by striation formation seen by α-actinin staining (green). Scale bar=100 µm and 30 µm.

Figure 8:
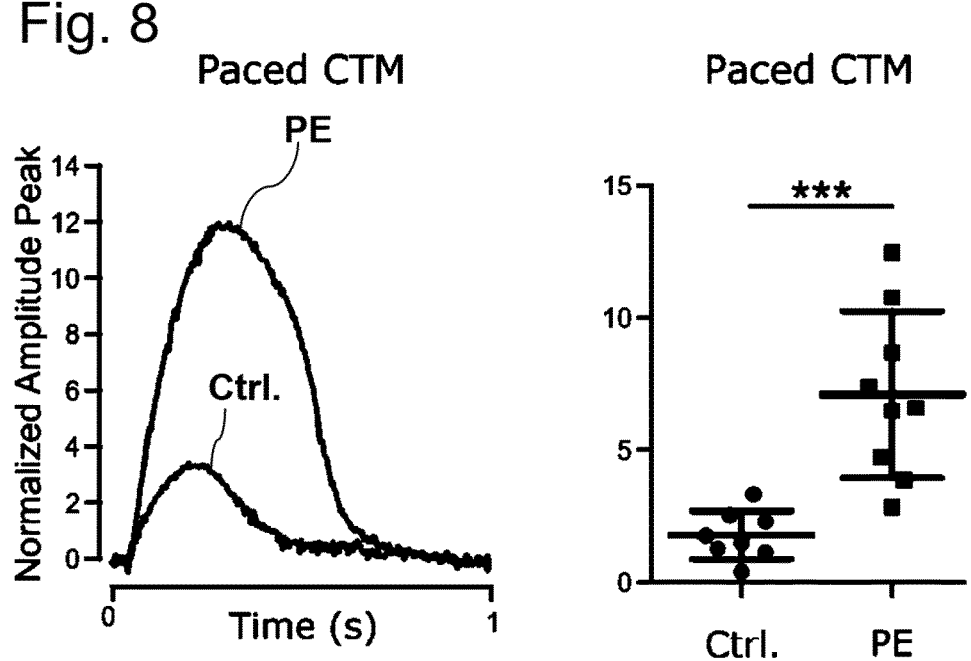
FIG. 8 shows the results of pacing experiments with cardiac tissue mimetics treated with phenylephrine (PE) compared to control tissue mimetics.

FIG. 8 illustrates CTM contractility upon electric pacing with 1 Hz. Contractility was determined by determining the amplitude peak of contracting CTMs (8 control vs. 9 PE-treated CTMs were used). One representative normalized amplitude trace per condition is shown on the right site.

Figure 9:
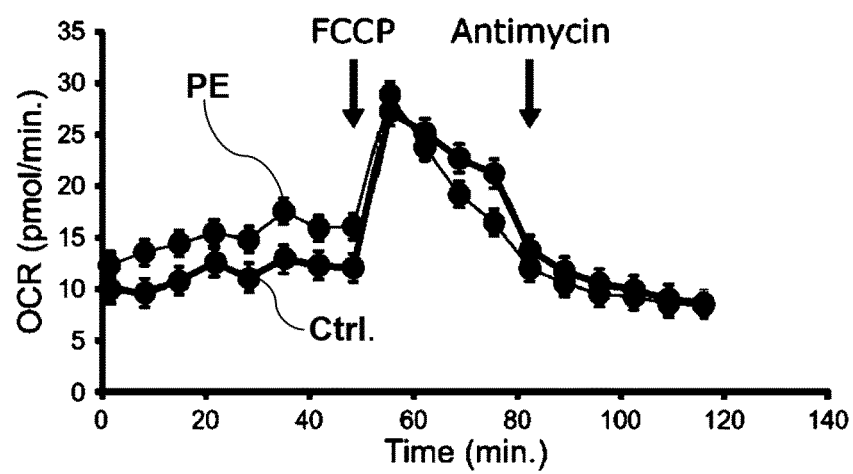
FIG. 9 shows the oxygen consumption rate of cardiac tissue mimetics treated with phenylephrine (PE) compared to control tissue mimetics.
Figure 10:
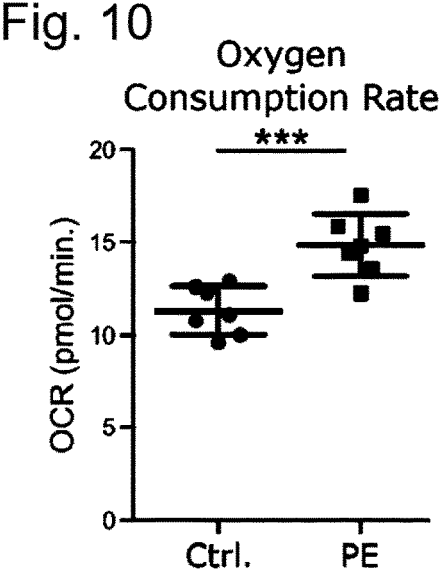
FIG. 10 shows oxygen consumption rates of cardiac tissue mimetics treated with phenylephrine (PE) compared to control tissue mimetics.

FIGS. 9 and 10 show the assessment of oxygen consumption rate (OCR) as a measure of glucose oxidation in CTMs treated with carbonyl cyanide-4 (trifluoromethoxy)-phenylhydrazone (FCCP) and antimycin as indicated. Depicted are rates expressed as OCR. (*P<0.05 compared to control treated CTMs, paired t-test).

Figure 11:
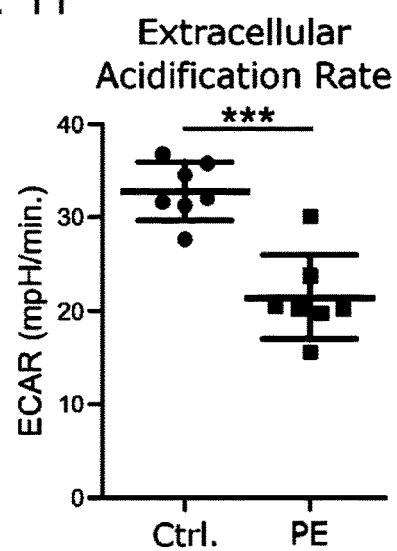
FIG. 11 shows extracellular acidification rates of cardiac tissue mimetics treated with phenylephrine (PE) compared to control tissue mimetics.

FIG. 11 depicts the assessment of basal extracellular acidification rate (ECAR) as a measure of glycolysis in CTMs treated as indicated (n=7).

Figure 12:
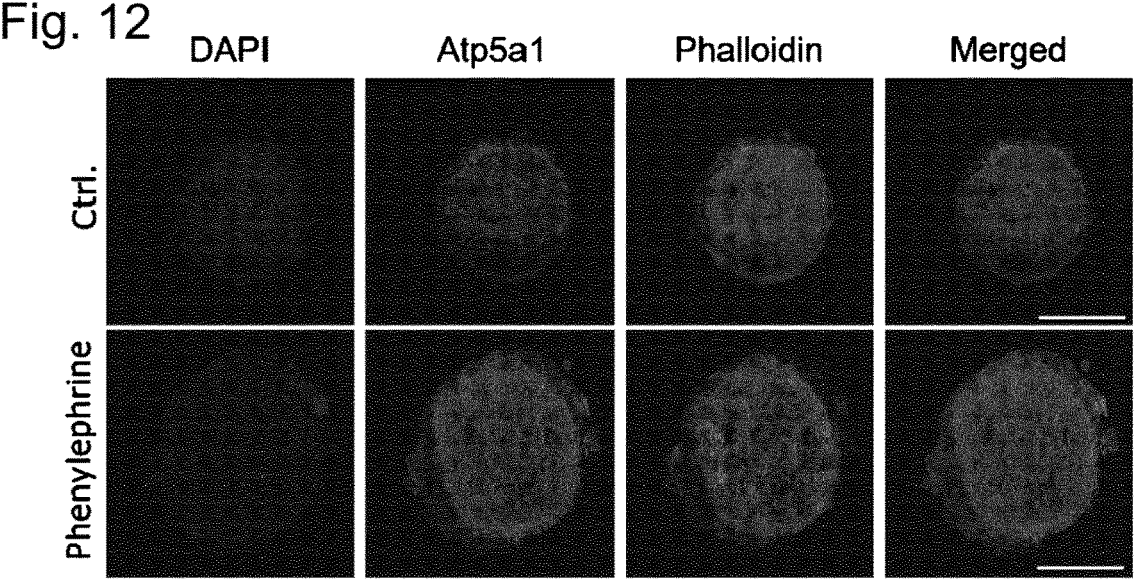
FIG. 12 shows microscopic images of cardiac tissue mimetics stained against Atp5a1 and phalloidin with and without phenylephrine (PE) treatment.

FIG. 12 shows microscopic images of tissue mimetics to study if phenylephrine has a toxic effect on mitochondrial density, mature control vs. PE CTMs were stained against Atp5a1 (red). Nuclei were stained with DAPI (blue) and cytoskeletal with phalloidin (magenta). A representative image is shown (scale bar=100 µm).

Data are shown as mean±SD. Statistical power was determined using the unpaired, two-sided T-test (FIGS. 4, 5, 8, 9, 10 and 11) and the nonparametric Mann-Whiteny test (FIG. 6), indicated as follows: *p<0.05, *p<0.001 and **p<0.0001.

FIGS. 13 to 19 show data indicating that phenylephrine induces cardiac tissue mimetic sprouting via paracrine signalling.

Figure 13:
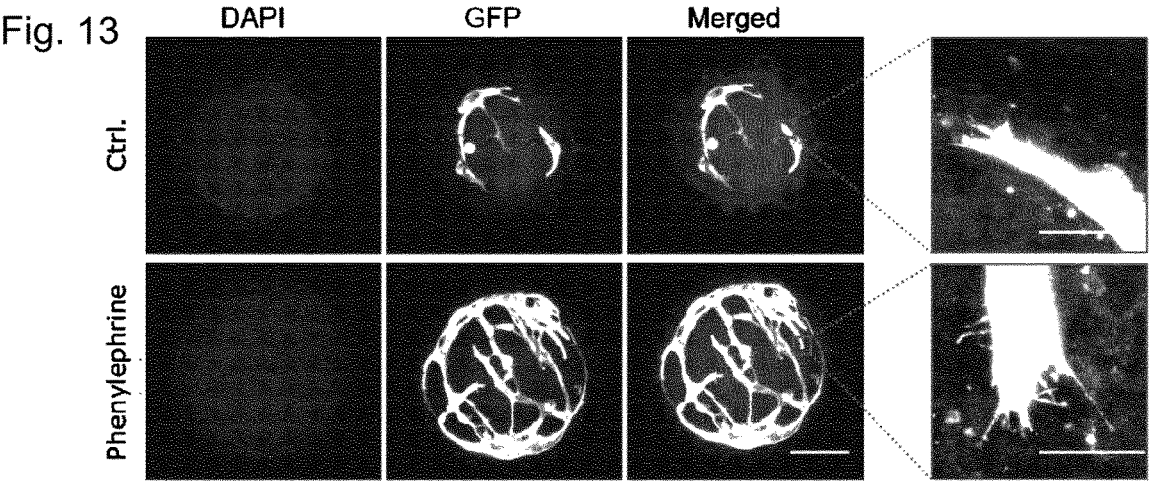
FIG. 13 shows fluorescence microscopic images showing vascular sprouting of cardiac tissue mimetics with and without phenylephrine (PE) treatment.
Figure 14:
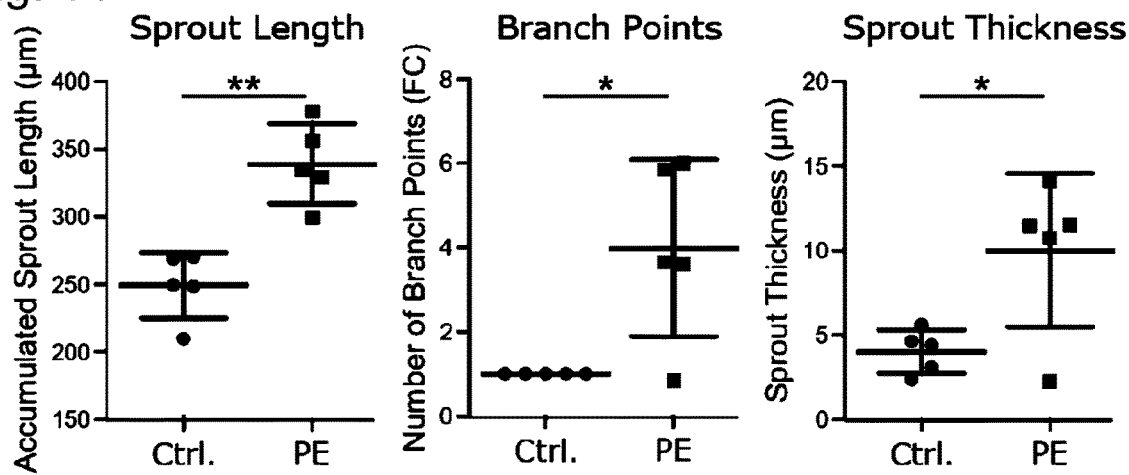
FIG. 14 shows the results of measurements of sprout length, vascular branch points and sprout thickness in cardiac tissue mimetics with and without phenylephrine (PE) treatment.

FIGS. 13 and 14 show in comparison to control (Ctrl.) conditions, 200 µM phenylephrine (PE) treatment for 10 days induces angiogenesis (scale bar=100 µm) and filopodia (scale bar=12.5 µm) formation (FIG. 13) as assessed by determining the accumulated sprout length, number of branch points and tube thickness in control vs. PE treated CTMs (FIG. 14, n=5) using the Leica TCS SP8 confocal microscope and the LAS X software.

Figure 15:
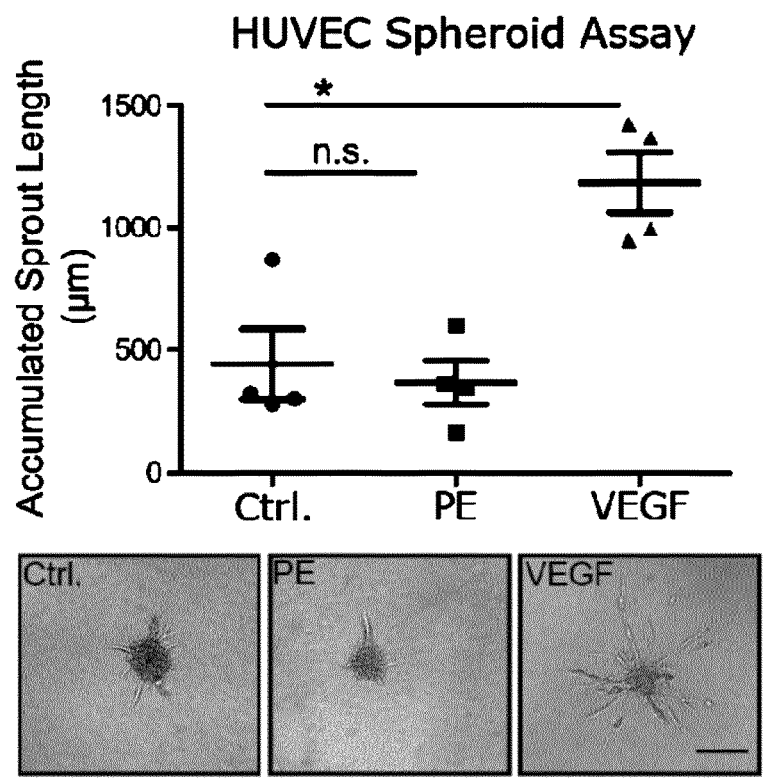
FIG. 15 shows the results of spheroid assays performed with human umbilical vein endothelial cells.

FIG. 15 illustrates the results of experiments to see if PE is influencing vessel growth directly, a spheroid-based angiogenic sprouting assay was performed using approx. 400 HUVEC per spheroid. HUVEC spheroids were embedded in a collagen matrix and treated with no stimulus (Ctrl.), 200 µM PE or 50 ng/mL vascular endothelial growth factor (VEGF) for 24 hours. Sprouting was determined by measuring the cumulative sprout length of ten randomly chosen spheroids using a computer-assisted microscope using Axiovision 4.5 (Zeiss) (scale bar=100 µm; n=4).

Figure 16:
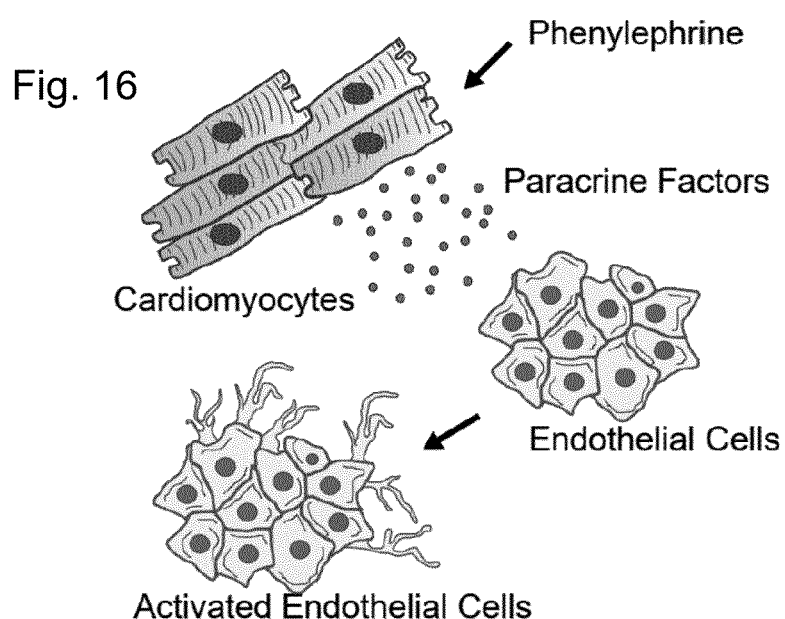
FIG. 16 is a schematic presentation used to illustrate the hypothesis that phenylephrine (PE) stimulates cardiomyocytes.

FIG. 16 is a schematic presentation used to illustrate the hypothesis that phenylephrine stimulates cardiomyocytes to secrete pro-angiogenic factors that activate the neighbouring endothelial cells.

Figure 17:
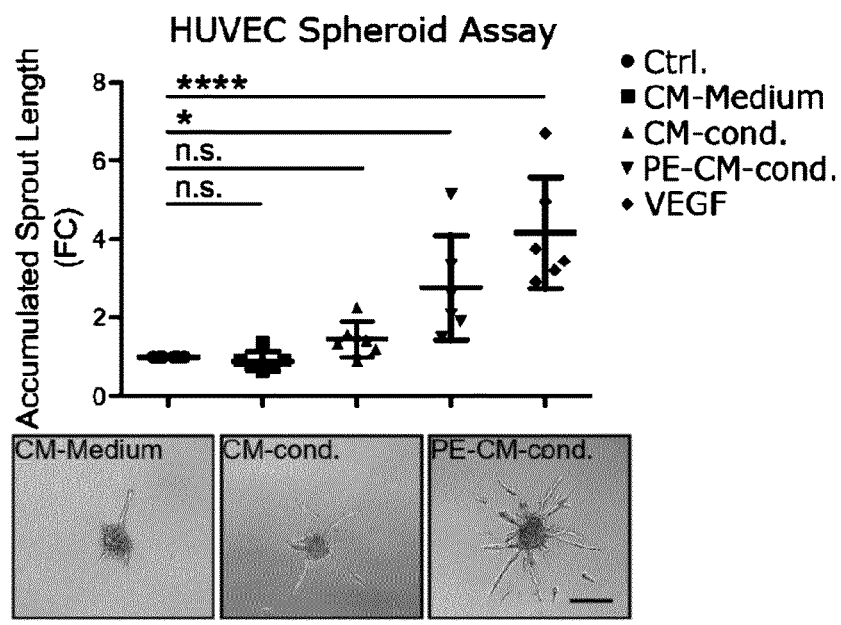
FIGS. 17+18 show the results of further HUVEC spheroid-based angiogenic sprouting assays stimulated by VEGF or cell culture supernatants of neonatal rat cardiomyocytes induced with phenylephrine (PE)

FIG. 17 shows the results of further experiments to assess whether PE-treated cardiomyocytes secrete pro-angiogenic factors, a further HUVEC spheroid-based angiogenic sprouting assay was performed by stimulating the HUVEC spheroids with blank maintenance medium, 50 ng/mL VEGF or cell culture supernatants of neonatal rat cardiomyocytes that were treated either with no PE or PE for 72 hours. Each treatment was applied for 24 hours before determining sprouting using a computer-assisted microscope using Axiovision 4.5 (Zeiss) (scale bar=100 µm; n=6).

Figure 18:
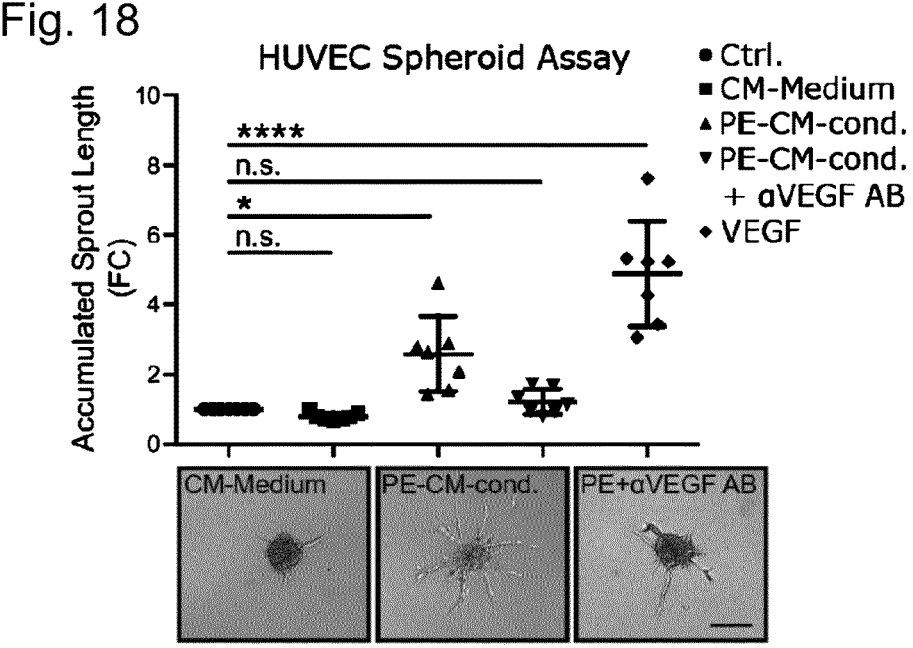

FIG. 18 illustrates the results of a HUVEC spheroid-based angiogenic sprouting assay to analyze the role of secreted VEGF using by stimulating spheroids with blank maintenance medium, 50 ng/mL VEGF, cell culture supernatants of neonatal rat cardiomyocytes that were treated with PE for 72 hours or cell culture supernatants of PE-treated neonatal rat cardiomyocytes that were supplemented with neutralizing anti-VEGF antibody (1:50, R&D Systems) before treating the HUVEC spheroids. Sprouting was determined by measuring the cumulative sprout length of ten randomly chosen spheroids using a computer-assisted microscope using Axiovision 4.5 (Zeiss) (scale bar=100 µm; n=7).

Figure 19:
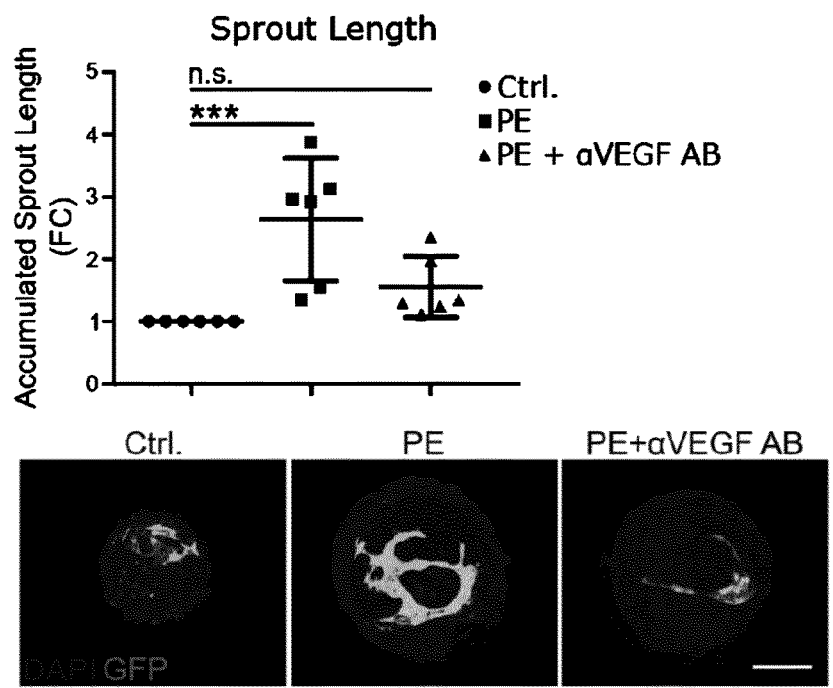
FIG. 19 shows the results of sprout length measurements and microscopic images of cardiac tissue mimetics to assess the role of vascular endothelial growth factor.

To assess the role of VEGF also in the CTM system, CTMs were cultured for 10 days after HUVEC addition without PE, with 200 µM PE or with 200 µM PE+1:50 neutralizing anti-VEGF antibodies (R&D Systems) (FIG. 19). Sprout length (GFP) was quantified using the Leica TCS SP8 confocal microscope and the LAS X software (scale bar=100 µm; n=6). Data are shown as mean±SD.

Statistical analysis was performed using the unpaired, two-sided T-test (FIG. 14). For comparisons of >2 groups, multiple-group ANOVA with a post hoc Bonferroni test was used for Gaussian distributed data (FIGS. 17 and 18), for non-Gaussian distributed data, Kruskal-Wallis test with a Dunn's correction was used (FIGS. 15 and 19=indicated as follows: n.s.=not significant; *P<0.05; P<0.01; *P<0.001 and ****P<0.0001.

FIGS. 20-25 show data indicating that contraction increases angiogenic sprouting.

Figure 20:
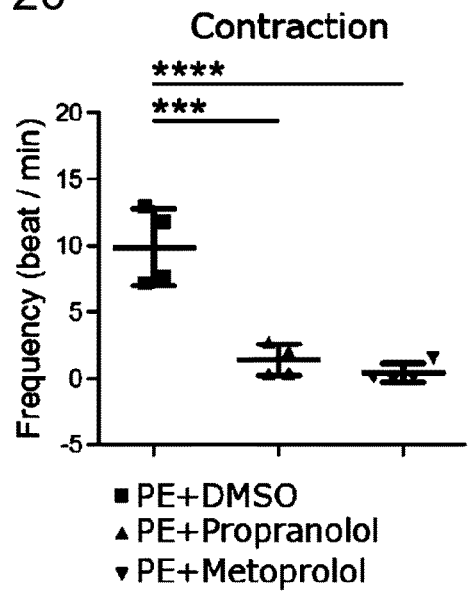
FIG. 20 shows the contraction frequency of cardiac tissue mimetics cultured in the presence of phenylephrine (PE) with and without β-blockers.
Figure 21:
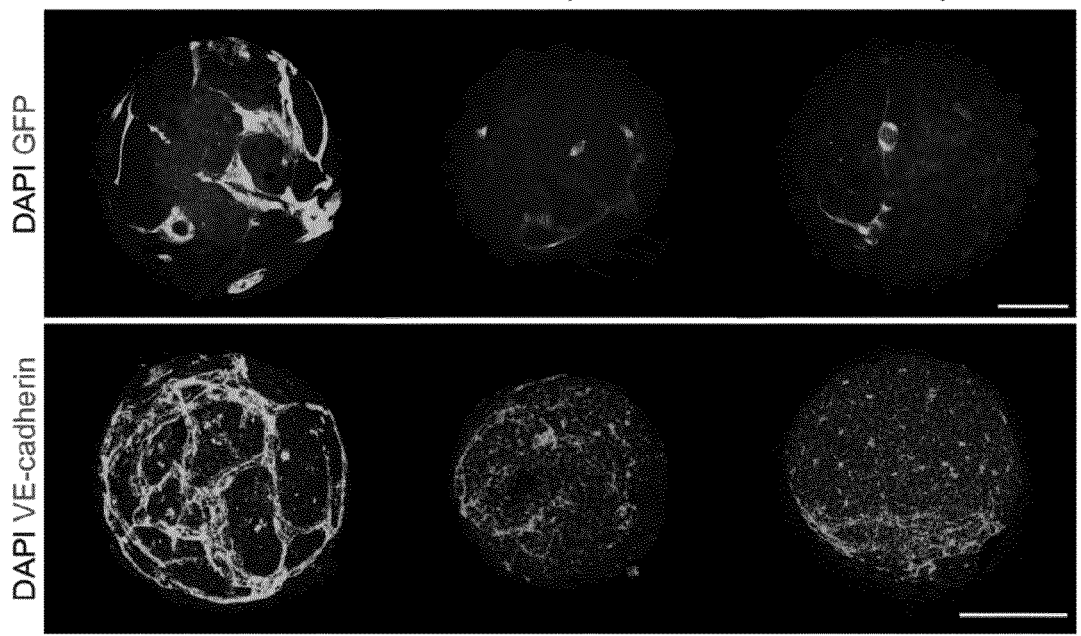
FIG. 21 shows microscopic pictures of cardiac tissue mimetics comprising GFP-labelled human umbilical vein endothelial cells (HUVEC) cultured with phenylephrine (PE) with and without β-blockers.
Figure 22:
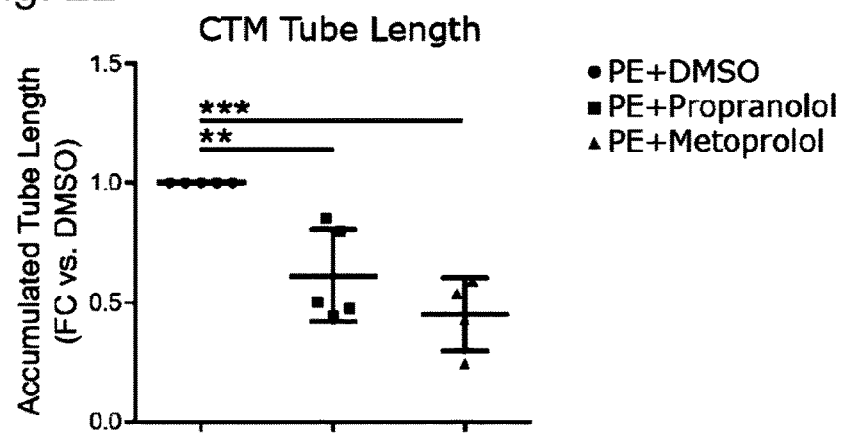
FIG. 22 shows the results of tube length measurement of GFP-labelled human umbilical vein endothelial cells (HUVEC) in cardiac tissue mimetics cultured with phenylephrine (PE) with and without β-blockers.

As shown in FIGS. 20-22, to decrease beating, CTMs were cultured for 10 days in 200 µM PE together with 1 µM of the β-blocker Propranolol, 50 µM of the β-blocker Metoprolol or 0.1% DMSO only (as solvent). Propranolol and Metoprolol both significantly decreased CTM contraction as determined by counting beats per minute (FIG. 20). 12 CTMs per condition were used for contractility measurements (n=5). VE-cadherin staining (green; bottom) as well as the use of GFP-labeled HUVEC (green; top) in PE-treated CTMs under 0.1% DMSO (control), 1 µM Propranolol or 50 µM Metoprolol showed a significant decrease in angiogenic sprouting upon both β-blocker stimulations compared to DMSO (scale bar=100 µm; FIG. 21) as quantified by using the Leica TCS SP8 confocal microscope and the LAS X software (FIG. 22; n=5 for PE+Propranolol and PE+DMSO and n=4 for PE+Metoprolol).

Figure 23:
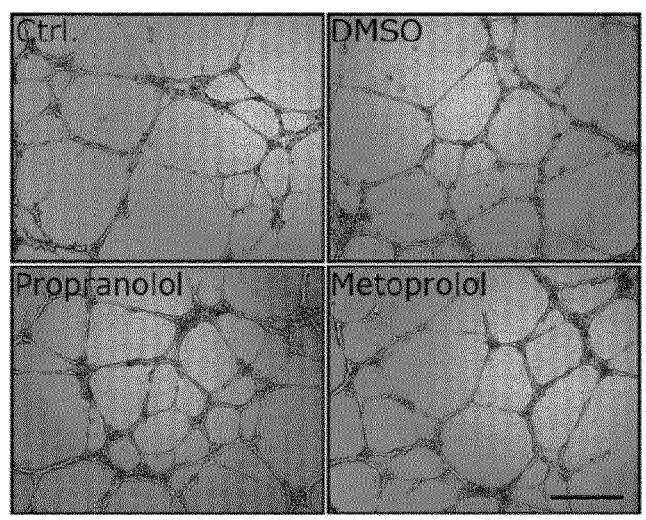
FIG. 23 shows microscopic images of human umbilical vein endothelial cells (HUVEC) forming tubes in the in the presence of phenylephrine (PE) or β-blockers.
Figure 24:
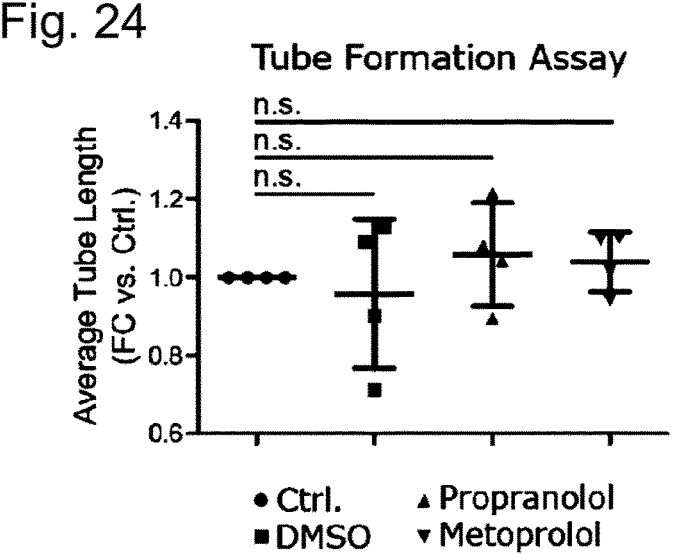
FIG. 24 shows the results of tube length measurements of human umbilical vein endothelial cells (HUVEC) in the presence of phenylephrine (PE) or β-blockers.

As illustrated in FIGS. 23 to 24, a tube formation assay was used to show that both β-blockers have no direct effect on HUVEC tube formation. HUVEC were cultured for 24 hours on Matrigel® in the presence of fully supplemented EBM™ (Ctrl.), 0.1% DMSO, 1 µM Propranolol or 50 µM Metoprolol (FIG. 23). Quantification of the accumulated tube length (FIG. 24) showed no differences among the four conditions (scale bar=200 µm; n=4).

Figure 25:
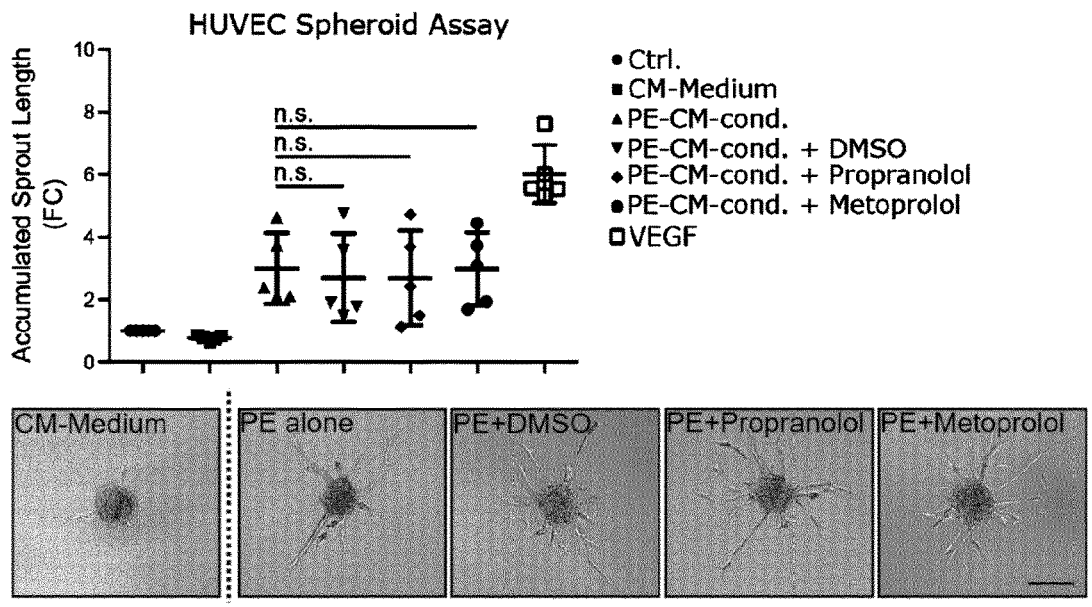
FIG. 25 shows the results of sprout length measurements of human umbilical vein endothelial cell spheroids cultured in the presence and absence of culture supernatents of neonatal rat cardiomyocytes.

As shown in FIG. 25, to exclude secretomic changes in the β-blocker treated CTMs, neonatal rat cardiomyocytes were cultured for 72 hours with 200 µM PE+0.1% DMSO (served as solvent), 1 µM Propranolol, 50 µM Metoprolol or with no further supplement. A HUVEC spheroid-based angiogenesis assay was used with approx. 400 HUVEC per spheroid. The HUVEC spheroids incubated with 100 µL of each cardiomyocyte supernatant, fully supplemented EBM™, maintenance medium or 50 ng/mL VEGF for 24 hours. Sprouting was determined by measuring the cumulative sprout lengths of ten randomly chosen spheroids using a computer-assisted microscope using Axiovision 4.5 (Zeiss) (scale bar=100 μm; n=5). Data are shown as mean±SD.

Statistical analysis was performed using multiple-group ANOVA with a post hoc Bonferroni test for Gaussian distributed data (FIGS. 20, 22 and 25), for non-Gaussian distributed data, a Kruskal-Wallis test with a Dunn's correction was used (FIG. 24), indicated as follows: n.s.=not significant; P<0.01 and *P<0.001.

FIGS. 26 to 32 show data indicating that CTMs respond to stress stimuli.

After 10 days of culturing with 200 μM PE, mature CTMs were cultured for further 3 days with 200 μM PE (Control), 200 μM PE+10 ng/mL TGF β2 from rat, or 0.1% $O_2$ (Hypoxia), to mimic a inflammatory/hypoxic stress condition in mature CTMs (FIGS. 26-32).

Figure 26:
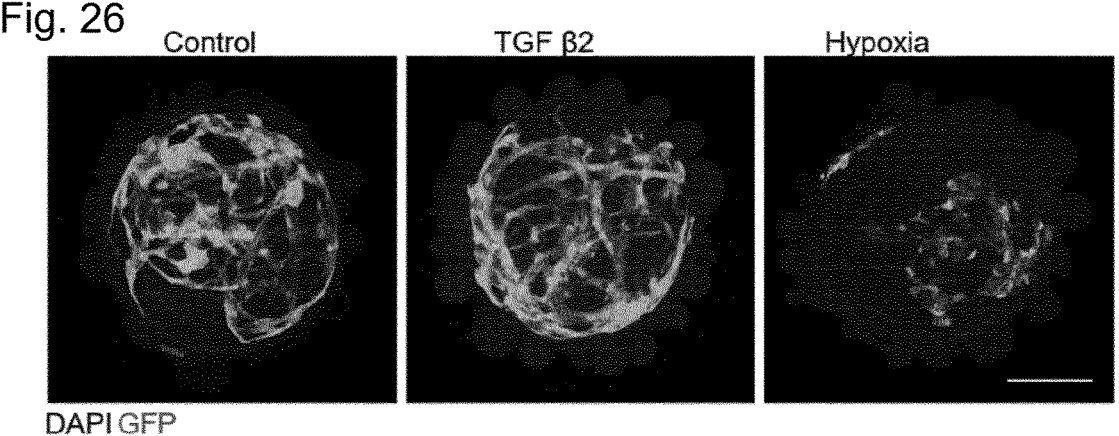
FIG. 26 shows microscopic images of CTMs with GFP-labelled HUVECs cultured with TGF β2 or under hypoxic conditions.
Figure 27:
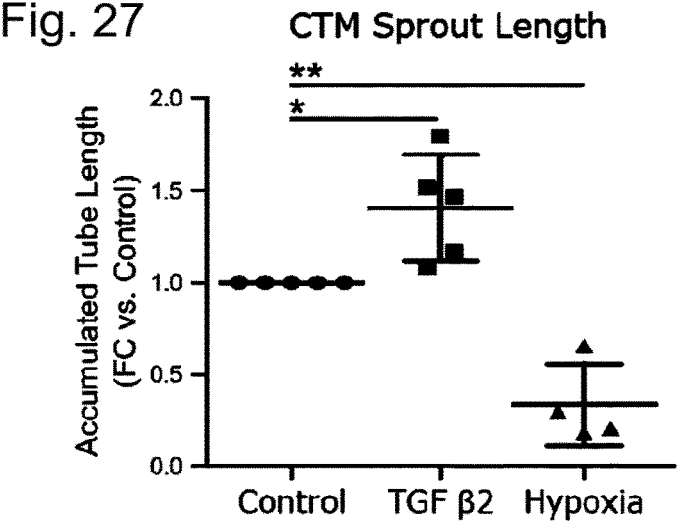
FIG. 27 shows the results of sprout length measurements of CTMs cultured with TGF β2 or under hypoxic conditions.

As shown in FIGS. 26 and 27, angiogenic sprouting (GFP-labeled HUVEC) within the CTMs was observed using the Leica TCS SP8 confocal microscope (scale bar=100 μm) and quantified using the LAS X software (FIG. 27, Control and TGF β2: n=5 and Hypoxia: n=4).

Figure 28:
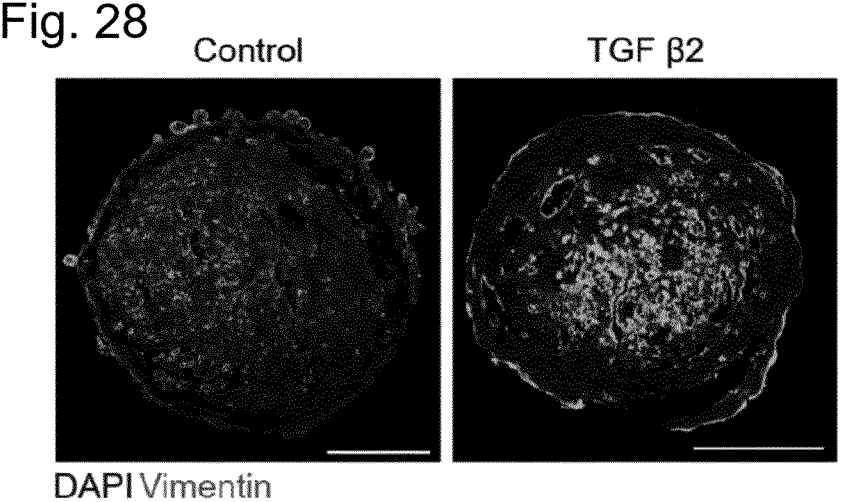
FIG. 28 shows microscopic images of CTMs with stained vimentin cultured in the presence and absence of TGF β2.

Vimentin (green) was stained in CTMs that were treated with or without TGF β2 (scale bar=100 μm), as depicted in FIG. 28.

Figure 29:
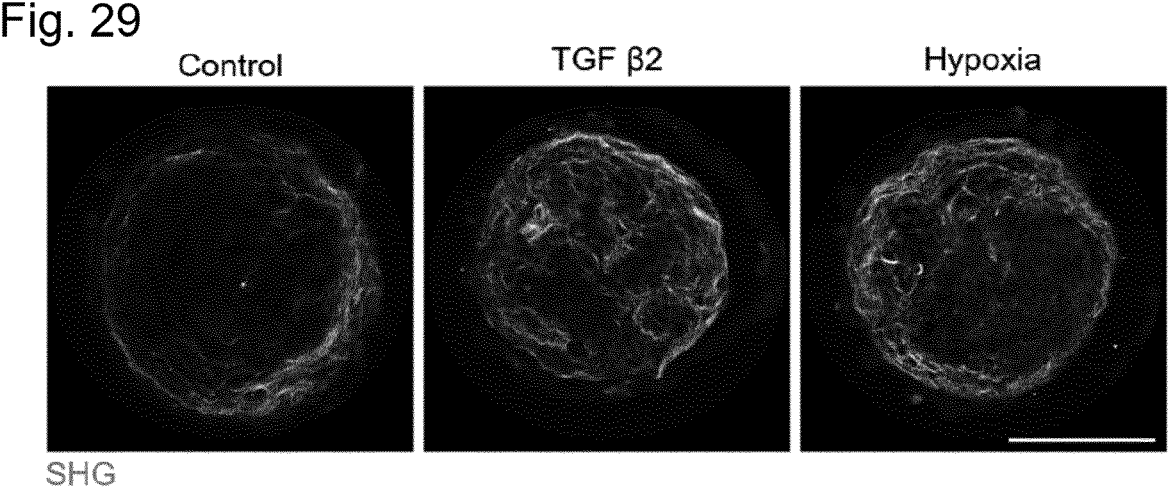
FIG. 29 shows microscopic images of CTMs cultured with TGF β2 or under hypoxic conditions using second harmonics generation to visualize large and highly structured molecules.

To obtain the results shown in FIG. 29, collagen deposition was recorded using Second-harmonics generation (SHG) on 10 μm thick CTM sections that were derived from mature CTMs cultured as described for FIGS. 26 and 27. SHG enables visualizing large and highly structured molecules, like collagen without using antibody stainings. By using high intensity lasers, collagen deposition was described in mature CTMs under PE alone, PE+TGF β2 or PE+hypoxia as seen in the representative images (scale bar=100 μm).

Figure 30:
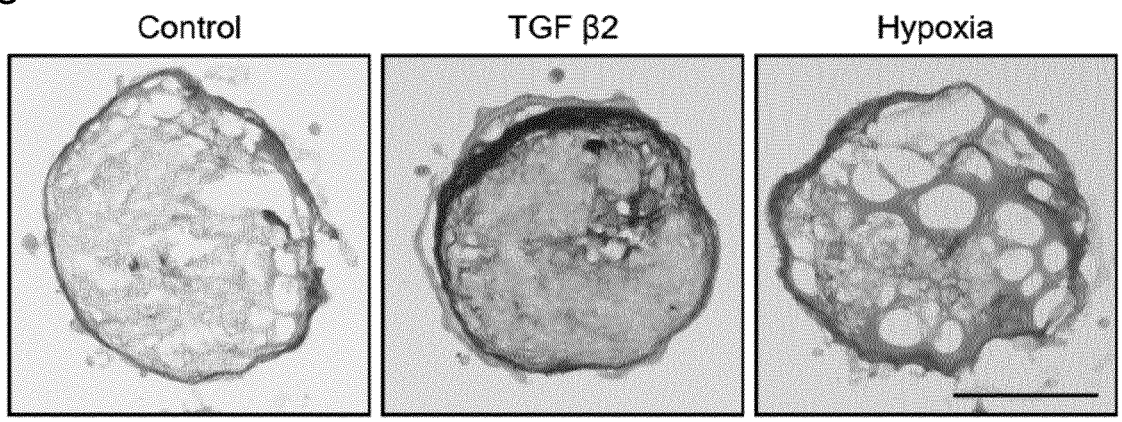
FIG. 30 shows microscopic images of CTM sections stained with Sirius red from CTMs cultures with TGF β2 or under hypoxic conditions.
Figure 31:
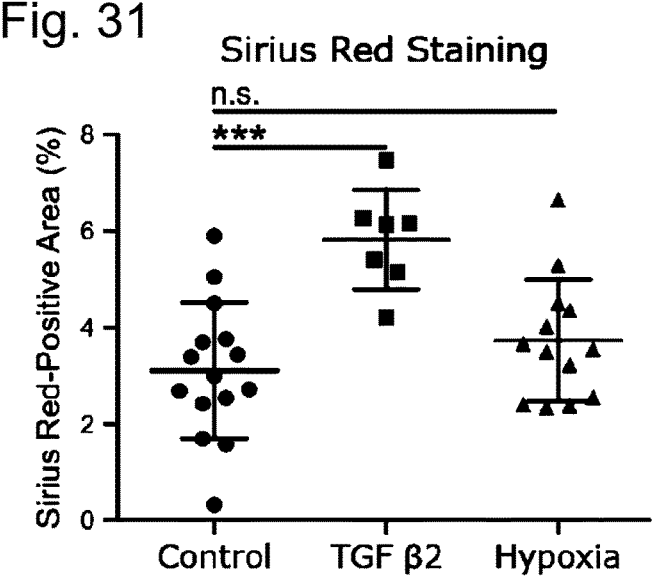
FIG. 31 shows a quantification of the results of Sirius red staining as shown in FIG. 30.

As depicted in FIGS. 30 and 31, collagen deposition was further recorded using Sirius red staining on 10 μm thick CTM sections that were derived from mature CTMs cultured as described for panel A and B (scale bar=100 μm; n=15 (control), n=7 (TGF β2), n=13 (hypoxia)).

Figure 32:
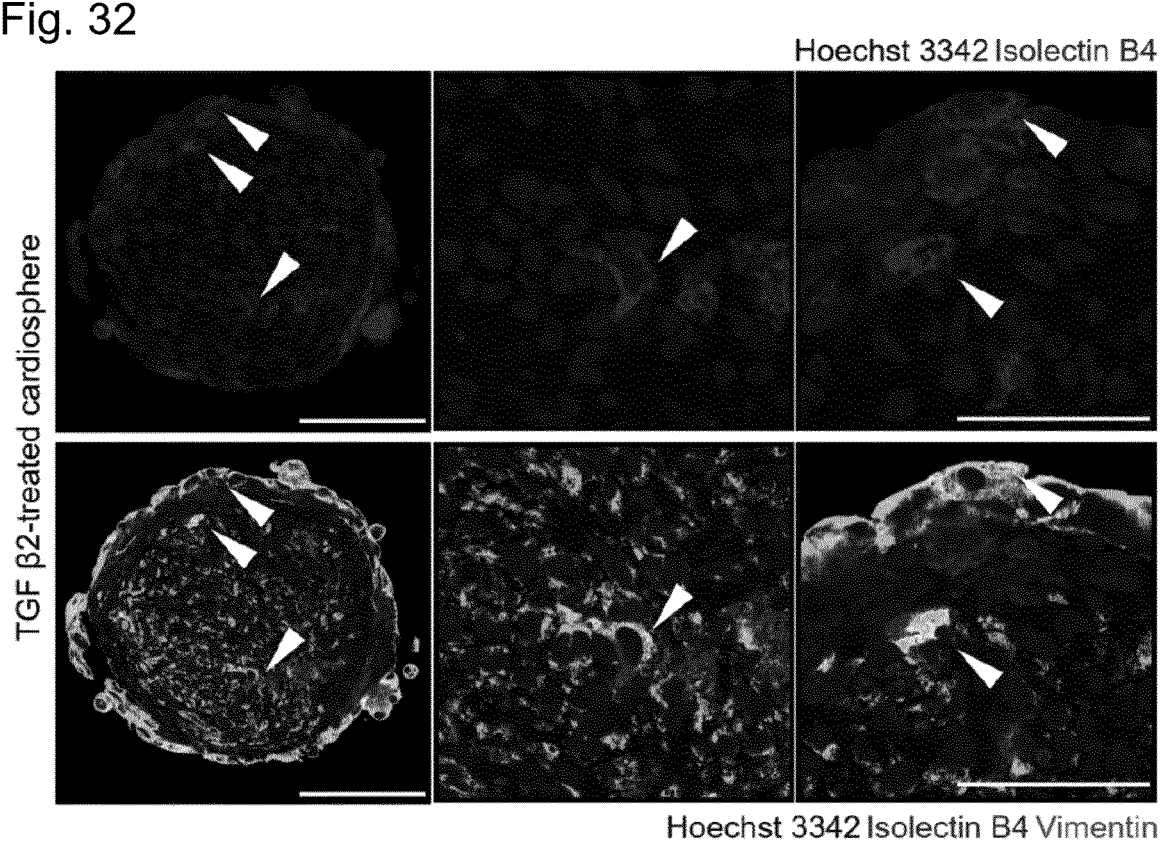
FIG. 32 shows microscopic images of TGF β2 treated CTMs with Hoechst 3342, Isolectin B4 and vimentin staining.

FIG. 32, left, is a representative overview image of a mature CTM that has been treated for 3 days with TGF β2. Endothelial cells were stained with Isolectin B4 (detected with Streptavidin-Alexa 555, red), whereas vimentin (green) was used as mesenchymal marker. Nuclei (blue) were counterstained with Hoechst 3342 (scale bar=100).

FIG. 32, right, shows high magnification images of endothelial cells (red; Isolectin B4) that are expressing vimentin (green) indicating endothelial-mesenchymal transition (white arrows). Nuclei (blue) were stained with Hoechst 33342 (scale bar=50 μm).

Data are shown as mean±SD. Statistical analysis was performed using multiple-group ANOVA with a post hoc Bonferroni test was used (FIGS. 27 and 31), indicated as follows: n.s.=not significant, *P<0.05, P<0.01 and *P<0.001.

Figure 33:
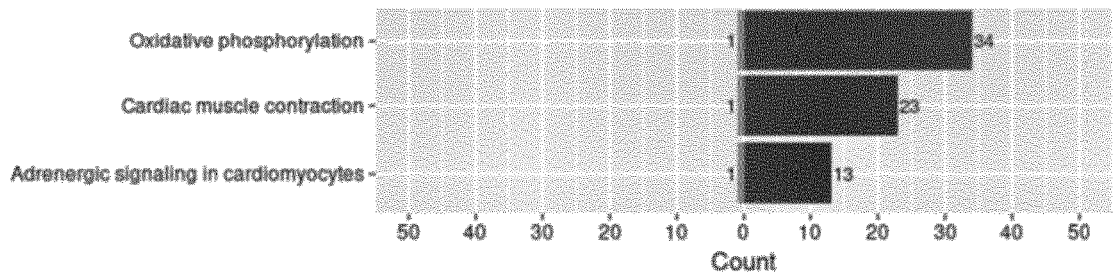
FIG. 33 shows the results of qPCR using cDNA obtained from the mRNA of CTMs according to the invention.
Figure 33:
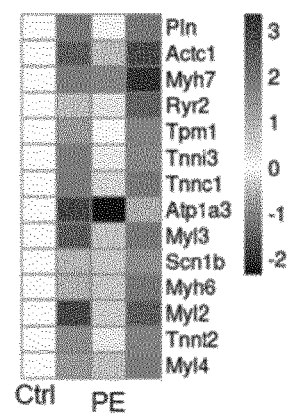
Figure 33:
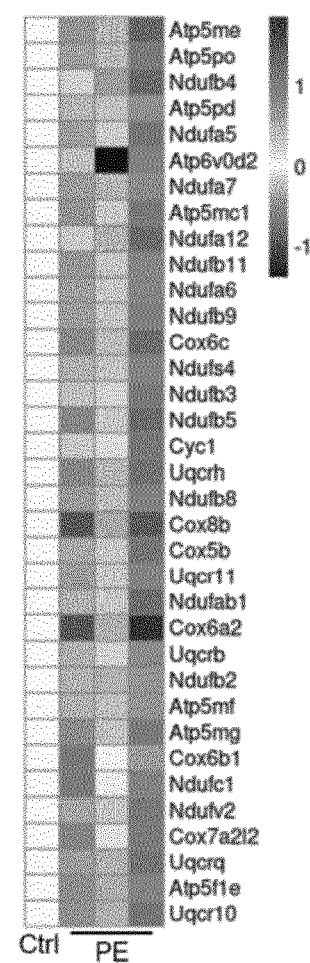
Figure 33:
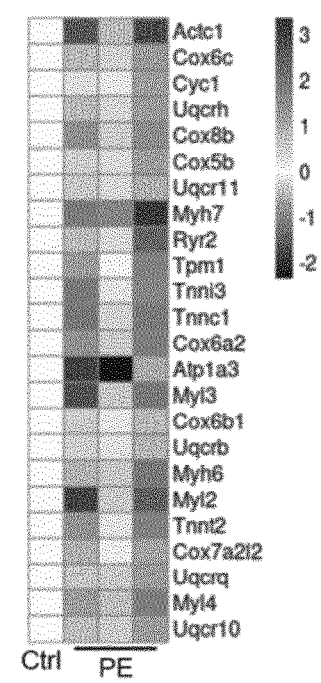

FIG. 33 shows that phenylephrine stimulation affects gene clusters implicated in angiogenesis, adrenergic signaling, angiogenesis, metabolism and contractility.

FIG. 33A shows relevant KEGG pathway enrichment in CTMs upon PE stimulation.

FIGS. 33B-D are heat map of differentially expressed adrenergic signalling pathway genes (B) metabolic genes (C) and genes involved in contraction (D) in phenylephrine-treated CTMs, normalized to log 2 FPKM of untreated control CTMs. Normalised Ctrl vales are shown (n=3) with the respective PE-treated replicates (n=3). *P<0.05 (A-D).

Figure 34:
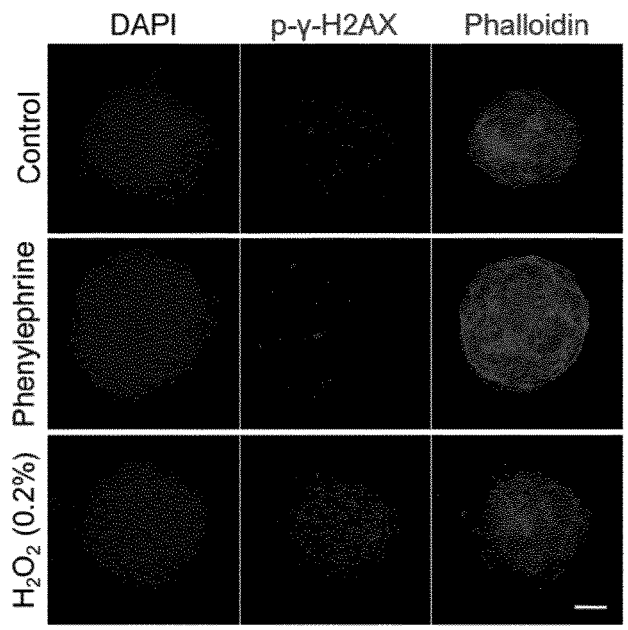
FIG. 34 shows microscopic images of phenylephrine (PE) and $H_2O_2$ treated CTMs using DAP, p-γ-H2AX and phalloidin staining.
Figure 35:
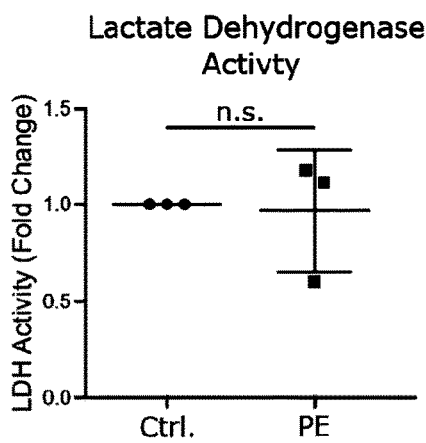
FIG. 35 shows lactate dehydrogenase (LDH) activity of phenylephrine (PE)-treated CTMs.

FIGS. 34 and 35 show data indicating that phenylephrine-treatment shows no cytotoxicity.

According to FIG. 34, mature CTMs were stained for p-γ-H2SX (red). One representative image per condition is shown where nuclei were stained with DAPI (blue) and cytoskeletal with phalloidin (magenta). As positive control served CTMs treated with 0.2% $H_2O_2$ for 30 minutes prior to immune staining (scale bar=50 μm).

As shown in FIG. 35, lactate dehydrogenase activity was determined in mature CTMs treated with (PE) or without (Ctrl.) phenylephrine using the lactate dehydrogenase activity assay kit (Sigma-Aldrich) (n=3).

Statistical power was determined using a Mann-Whitney test and data are shown as mean±SD (n.s.=not significant).

Figure 36:
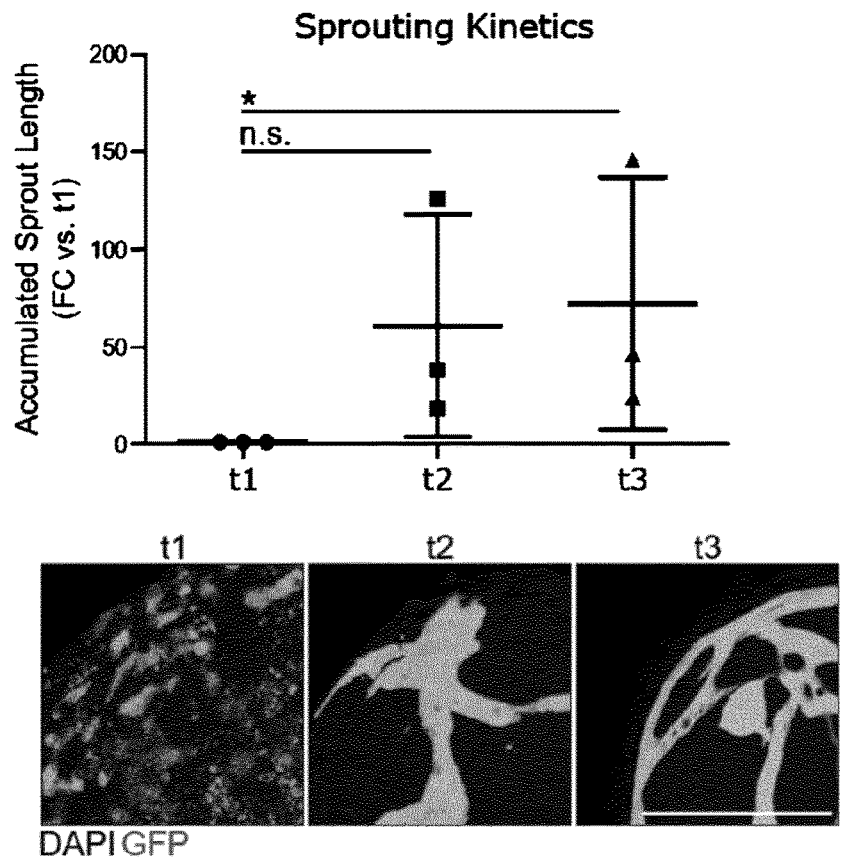
FIG. 36 shows sprouting kinetics of CTMs treated with phenylephrine (PE)
Figure 37:
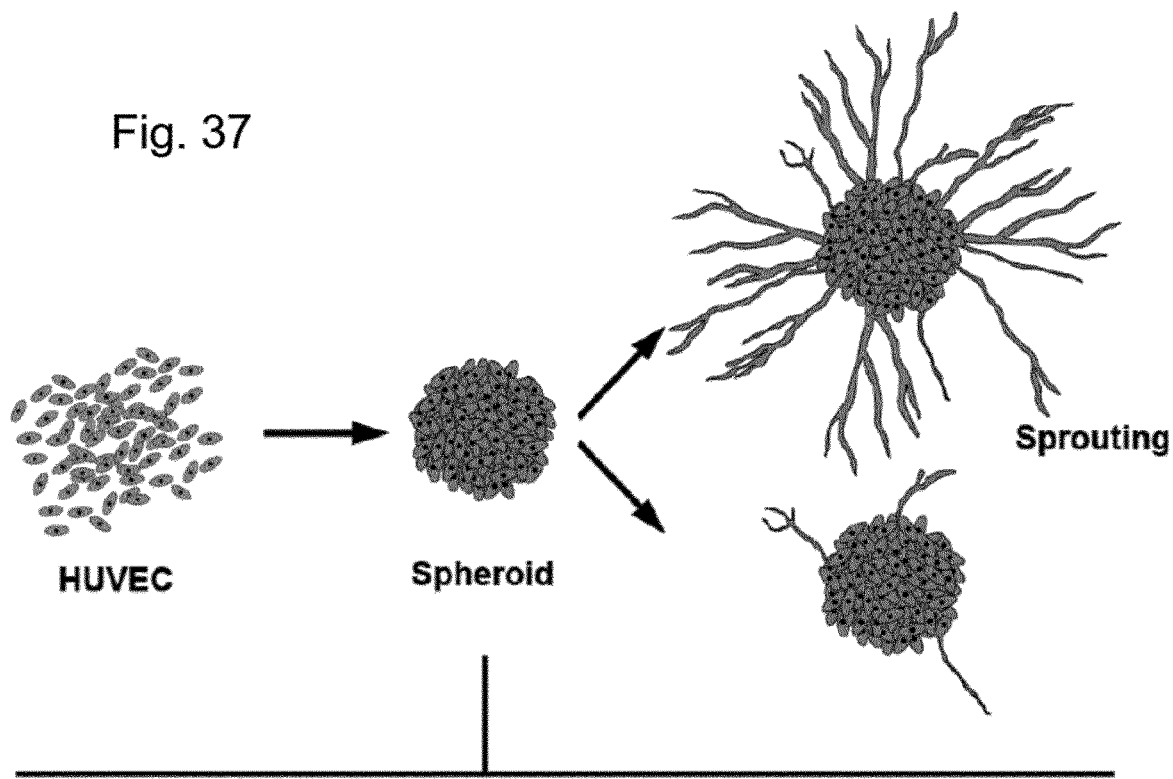
FIG. 37 is a schematic illustration of the spheroid based angiogenic sprouting assay.
Figure 37:
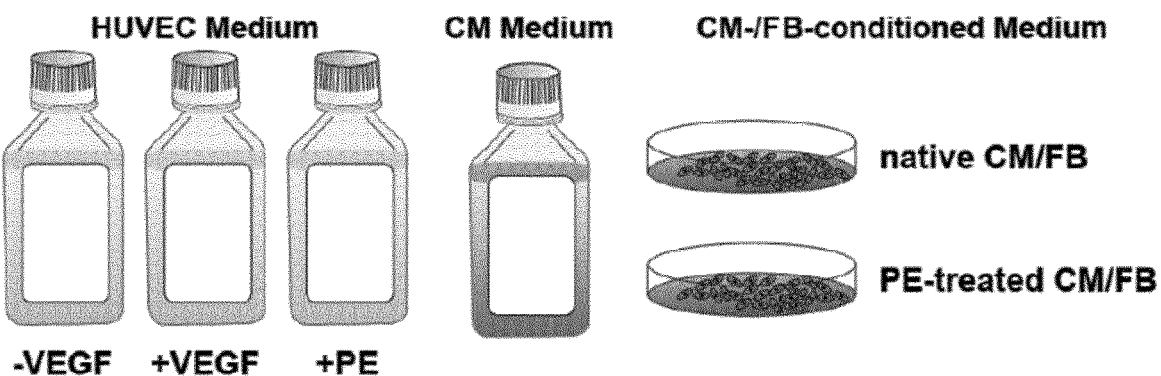
Figure 38:
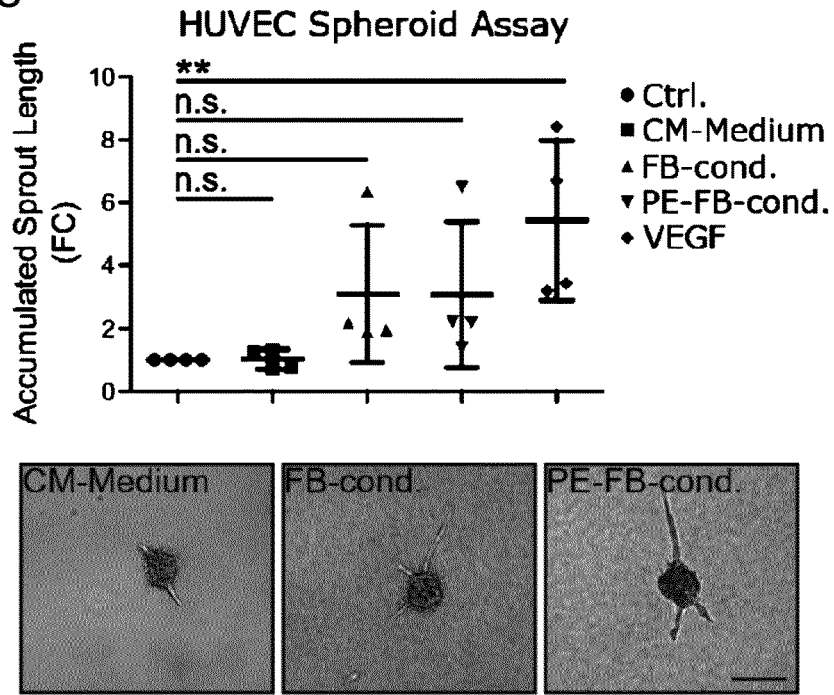
FIG. 38 shows the results of the spheroid angiogenic sprouting assay using different conditioned media.

FIGS. 36-38 show data indicating that angiogenesis is initiated in CTMs upon phenylephrine-treatment.

FIG. 36 shows a kinetic of angiogenic sprouting in CTMs upon phenylephrine-treatment. CTMs after 1 day (t1), 5 days (t2) and 10 days (t3) after GFP-HUVEC addition were fixed. Vascularization was determined using the Leica TCS SP8 confocal microscope and the LAS X software by measuring the accumulated HUVEC-sprout length (scale bar=100 μm; n=3).

FIG. 37 displays the schematic set-up of spheroid based angiogenic sprouting assay.

As shown in FIG. 38, to assess whether PE-treated cardiomyocytes secrete pro-angiogenic factors, a further HUVEC spheroid-based angiogenic sprouting assay was performed by stimulating the HUVEC spheroids with blank maintenance medium, 50 ng/mL VEGF or cell culture supernatants of neonatal rat fibroblasts that were treated either with no PE or PE for 72 hours. Each treatment was applied for 24 hours before determining sprouting using a computer-assisted microscope using Axiovision 4.5 (Zeiss) (scale bar=100 μm; n=4).

Data are shown as mean±SD. Statistical analysis was performed using a multiple-group Kruskal-Wallis test with a post hoc Dunn's correction test was used (FIGS. 36 and 38). n.s.=not significant; *P<0.05 and **P<0.01.

Figure 39:
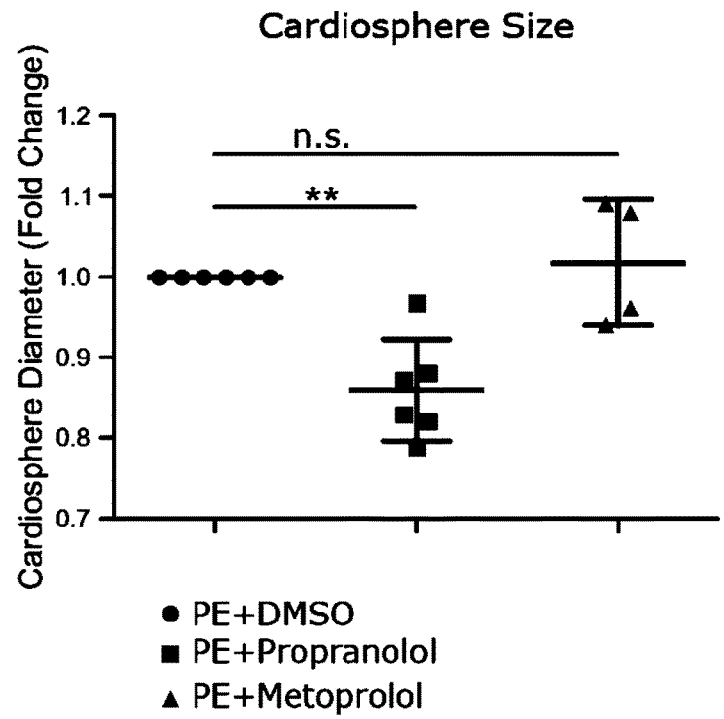
FIG. 39 illustrates the results of diameter measurements of CTMs cultured in the presence of phenylephrine (PE) with and without β-blockers.

FIG. 39 shows data indicating that CTM size is altered upon β-blocker-treatment.

The size of mature CTMs treated for 3 days with PE+0.1% DMSO (n=6) or treated with 200 μM PE+1 μM Propranolol (n=6)/50 μM Metoprolol (n=4) is illustrated. CTM size is shown as fold change. Data are shown as mean±SD. Statistical analysis was performed using a multiple-group Kruskal-Wallis test with a post hoc Dunn's correction test was used (A and C). n.s.=not significant and ***P<0.001.

Figure 40:
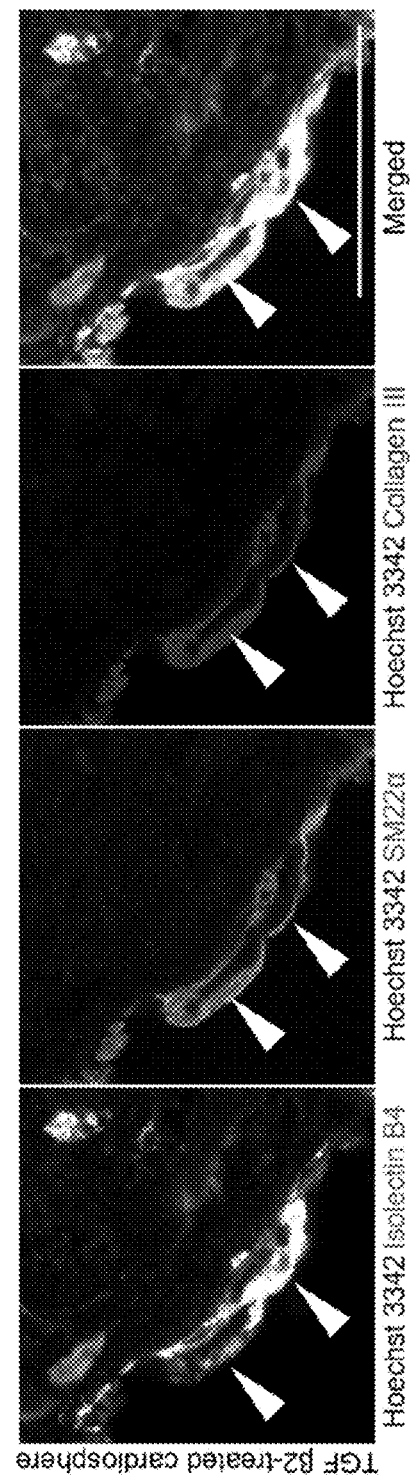
FIG. 40 shows microscopic images of TGF β2 treated CTMs with Hoechst 3342, Isolectin B4, SM22α and Collagen III staining.

FIG. 40 shows data indicating that an endothelial-mesenchymal transition occurs in CTMs upon TGF β2 treatment.

High magnification images of endothelial cells (white; Isolectin B4) are shown that are expressing SM22α (green) and collagen III (red) indicating endothelial-mesenchymal transition (white arrows). Nuclei (blue) were stained with Hoechst 33342 (scale bar=50 μm).

Figure 41:
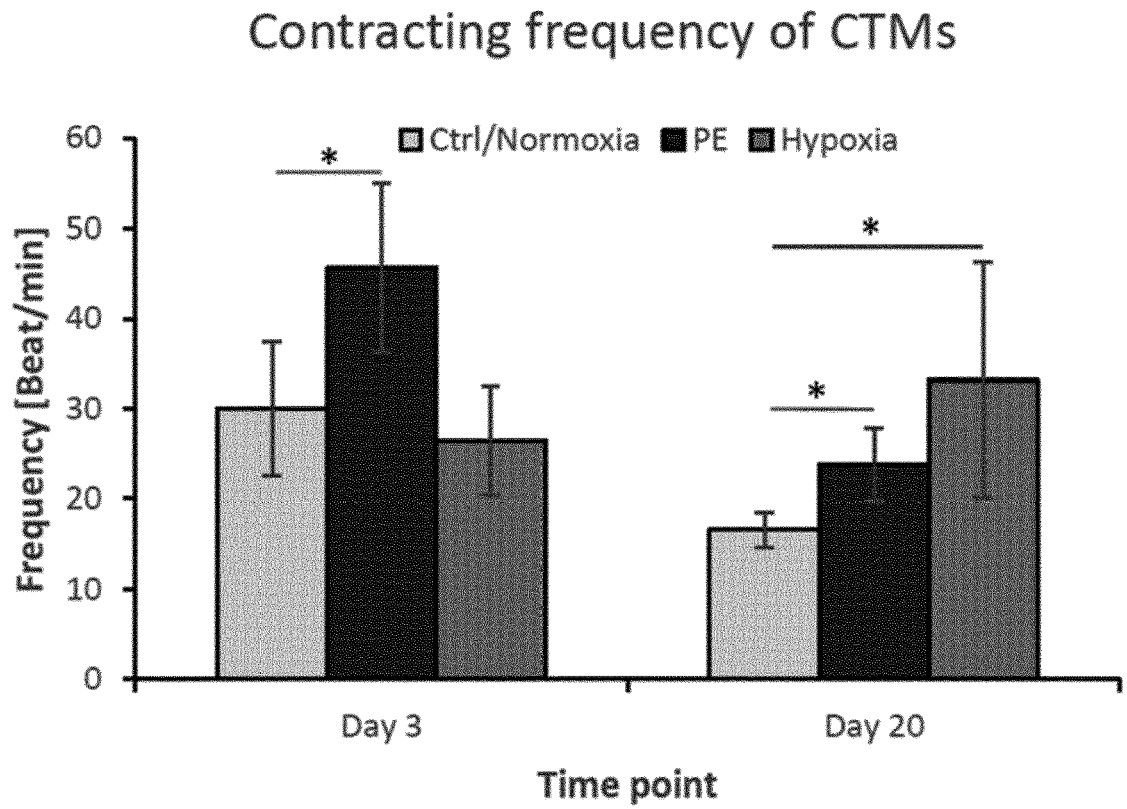
FIG. 41 shows the results of contraction frequency measurements of cardiac tissue mimetics (CTMs) according to the invention obtained from human iPSC at day 3 and day 20 after PE-treatment or hypoxia.

FIG. 41 shows the results of contraction frequency measurements of cardiac tissue mimetics (CTMs) according to the invention obtained from human iPSC. After 10 days of culture, CTMs were treated with 200 μM Phenylephrine (PE), and in parallel, were cultured under conditions of hypoxia (3% $O_2$). Videos of contracting CTMs were recorded for 1 min and analysed to observe the response. The contraction frequency was measured at day 3 (to obtain a short-term response) and day 20 (to obtain a long-term response).

At day 3, PE-treated CTMs showed significantly increased contraction frequency, a known short-term effect of PE, while hypoxia-cultured CTMs showed no changes. At day 20, both PE-treated and hypoxia-cultured CTMs showed significantly increased contracting frequencies as an indication of stress.

Figure 42:
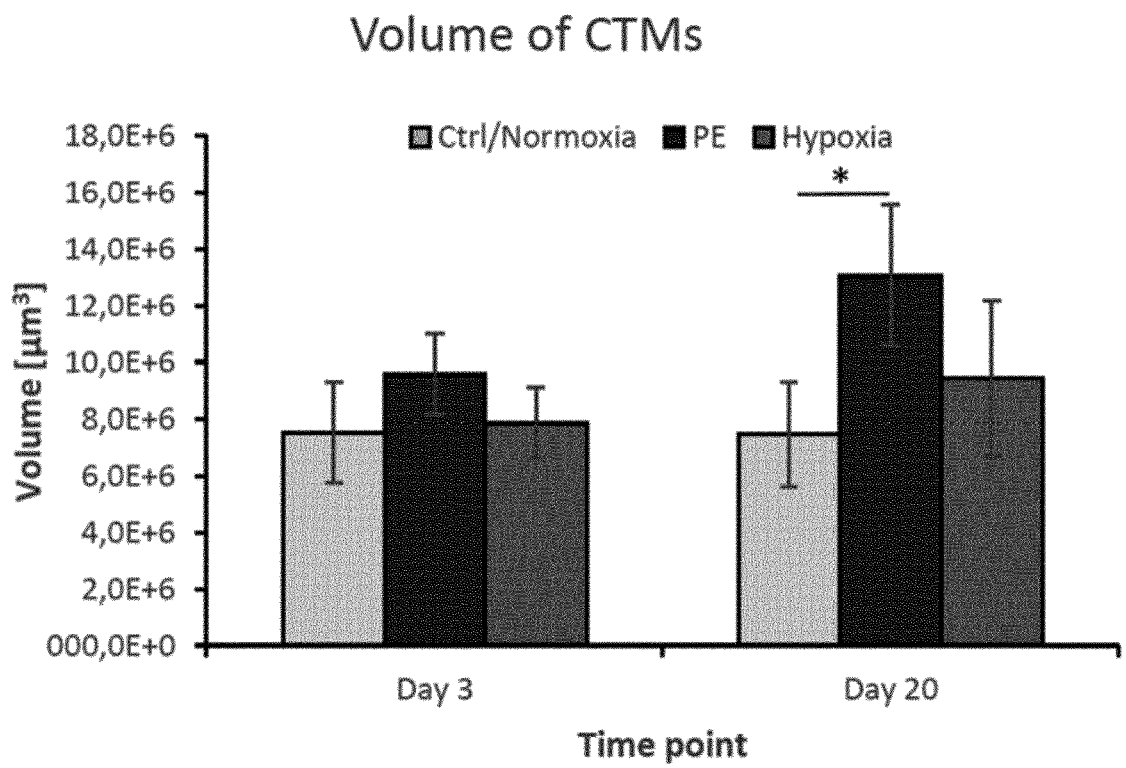
FIG. 42 shows the results of volume measurements of CTMs according to the invention obtained from human iPSC at day 3 and day 20 after PE-treatment or hypoxia.

FIG. 42 illustrates the results of volume measurements of CTMs according to the invention obtained from human iPSC. In parallel to the experiments yielding the results shown in FIG. 41, the diameter of CTMs was documented, and the volume of the CTMs was determined at day 3 (to obtain a short-term response) and day 20 (to obtain a long-term response) after treatment by PE-addition or hypoxia to assess if hypertrophy occurred.

At day 3, no significant change in the volume of the CTMs was detected. At day 20, PE-treated CTMs showed a significant increase in volume compared to the control as an indication of hypertrophy. Hypoxia-cultured CTMs showed the tendency of increasing their volume, however the result was not significant.

Figure 43:
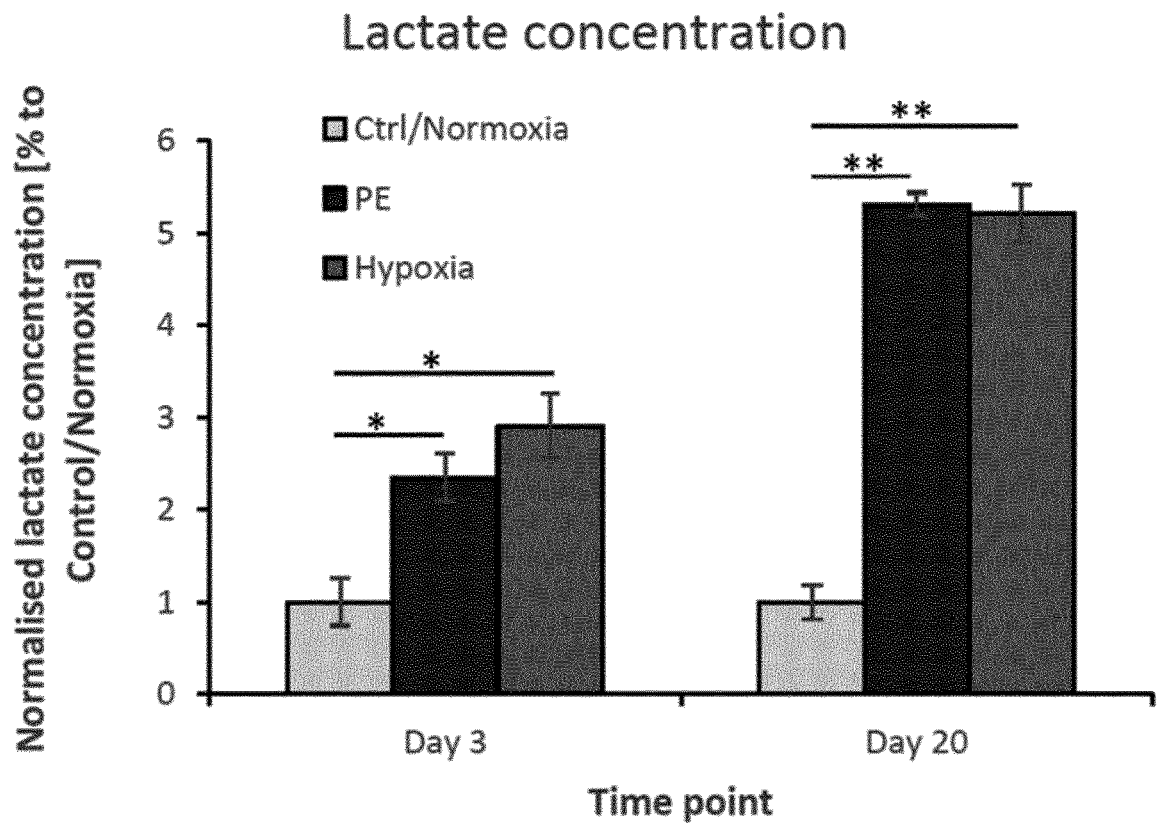
FIG. 43 shows the results of measurements of lactate concentration in CTMs according to the invention obtained from human iPSC at day 3 and day 20 after PE-treatment or hypoxia.

FIG. 43 shows the results of measurements of lactate concentration in CTMs according to the invention obtained from human iPSC.

In parallel to the experiments yielding the results shown in FIGS. 41 and 42, culture media of the CTMS were collected and at day 3 (to obtain a short-term response) and day 20 (to obtain a long-term response) after treatment by PE addition or hypoxia, lactate assays were performed on the media to assess a potential metabolic change.

Both at day 3 and day 20, both PE-treated and hypoxia-cultured CTMs showed a significant increase in lactate concentration as an indication of a metabolic shift to a disease state.

Figure 44:
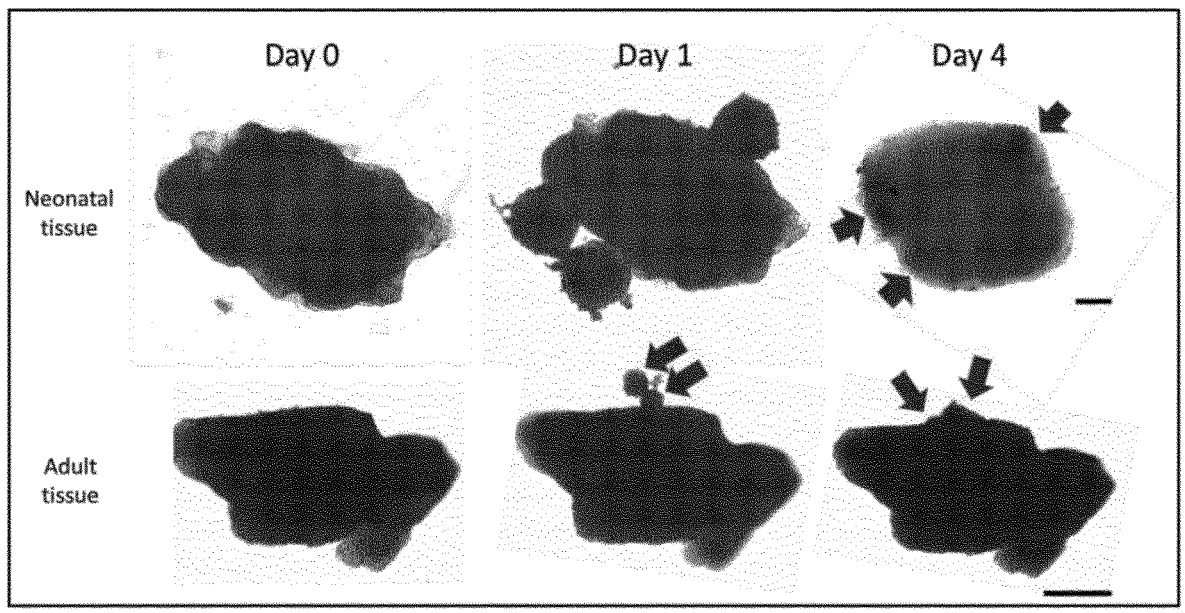
FIG. 44 shows the results of a tissue-integration experiment using CTMs from human iPSC according to the invention.

FIG. 44 shows the results of a tissue-integration experiment using CTMs from human iPSC according to the invention. Heart tissue was harvested from neonatal rat pups and mature rat. A small piece of tissue was sectioned and cultured in mixed medium of iCell® Cardiomyocytes maintenance medium and EC growth medium at a ratio of 1:1 for 24 h prior to co-culturing with CTMs. CTMs according to the invention from human iPSC were harvested after 10 days of culturing, and subsequently co-cultured with the heart tissue. The medium was changed every day. Images were captured to observe the integration of the CTMs into the heart tissue (see arrows in FIG. 44).

EXAMPLES

Example 1

Generation of Cardiac Tissue Mimetics from Triculture of CM, FB and EC Cells

Methods

Human iPS cardiomyocytes (hiPS-CMs) were ordered from Fujifilm CDI and thawed before the culture. Human cardiac fibroblasts (hCFB) were cultured and trypsinized. The two cell types were mixed at a CM:FB ratio of 5:1 in plating medium (PM provided by CDI). The mixed cells were left to form cardiac tissue mimetics in 30 μL hanging drops containing PM with a density of 5000 hiPS-CMs and 1000 hCFB and incubated at 37° for four days. The cardiac tissue mimetics were then collected, and every single cardiac tissue mimetic was again distributed into each well of ultra-low-attachment (ULA) plates with maintenance medium (MM; provided by CDI). MM was changed every two days. After seven days, human IPS endothelial cells (hiPS-ECs) were thawed and added into each well at a CM:EC ratio of 2:1. A mixed medium of MM and EC growth medium (EGM; provided by CDI) at a 1:1 ratio was used and half of the medium was changed every second day. After 10 days cardiac tissue mimetics were harvested for further assays. A schematic overview of the methodology is shown in FIG. 1.

Results

As shown in FIG. 2A, when EC, FB and CM are seeded at specific ratios and in a particular order (discussed in Methods section), they conglomerate spontaneously to form 3D spheroidal structures that resemble cardiac tissue. The coculture of all three cell types shows the most compact form in comparison to monoculture and biculture. In the immunofluorescent images in FIG. 1B upper panel, DAPI is used to stain for nuclei for all cells, while α-actinin and VE-cadherin serve to mark hiPS-CM and hiPS-EC respectively. As noted, the three cell types intermingle yet form cell clusters at certain foci, as is observed in the native myocardium. The high magnification image in FIG. 1B lower panel highlights the well-developed sarcomeric structures contained within cardiomyocytes and vascular network from endothelial cells.

Example 2

Dissection of Heterocellular Cross-Talk in Vascularized Cardiac Tissue Mimetics

Introduction

The heart comprises of several different cell types including cardiomyocytes (CM), endothelial cells (EC) and fibroblasts (FB), which closely interact during tissue homeostasis and in pathophysiological conditions (R. G. Gourdie, S. Dimmeler, P. Kohl, 2016, Nat Rev Drug Discov 15(9), 620-38; S. L. Lim, C. S. Lam, V. F. Segers, D. L. Brutsaert, G. W. De Keulenaer, 2015, European heart journal 36(31), 2050-2060).

In spite of this, in vitro models largely rely on 2D CM monocultures for disease modeling and drug screening (J. C. Del Alamo, D. Lemons, R. Serrano, A. Savchenko, F. Cerignoli, R. Bodmer, M. Mercola, 2016, Biochimica et biophysica acta 1863(7 Pt B), 1717-27). However, 2D monocultures lack cellular maturity and cannot accurately mimic native tissue response to pharmacological agents (J. Jabs, F. M. Zickgraf, J. Park, S. Wagner, X. Jiang, K. Jechow, K. Kleinheinz, U. H. Toprak, M. A. Schneider, M. Meister, S. Spaich, M. Sutterlin, M. Schlesner, A. Trumpp, M. Sprick, R. Eils, C. Conrad, 2017, Mol Syst Biol 13(11), 955).

To circumvent these issues, 3D CM culture methods have been developed. While an improvement over 2D cultures, 3D CM monocultures do not recapitulate the inter-cellular cross-talk between CMs, FBs and EC that is typical of the native myocardium (R. G. Gourdie, S. Dimmeler, P. Kohl, 2016, Nat Rev Drug Discov 15(9), 620-38; S. L. Lim, C. S. Lam, V. F. Segers, D. L. Brutsaert, G. W. De Keulenaer, 2015, European heart journal 36(31), 2050-2060)

This is particularly striking considering FBs and ECs make up 70-80% of the heart by cell number (O. Bergmann, S. Zdunek, A. Felker, M. Salehpour, K. Alkass, S. Bernard, S. L. Sjostrom, M. Szewczykowska, T. Jackowska, C. Dos Remedios, T. Maim, M. Andra, R. Jashari, J. R. Nyengaard, G. Possnert, S. Jovinge, H. Druid, J. Frisen, 2015, Cell 161(7), 1566-75; Y. Tang, J. R. Nyengaard, J. B. Andersen, U. Baandrup, H. J. Gundersen, 2009, Anat Rec (Hoboken) 292(10), 1630-47).

Thus, studying the response of 3D CM monocultures to pathologic stress or drug stimuli ignores the interaction and impact of resident cardiac FBs and ECs. For example, pathologic stimuli is shown to induce adaptive growth of ECs to satisfy the increased oxygen demands of the enlarged heart, and inhibition or impairment of this adaptive pro-angiogenic mechanism results in heart failure (I. Shiojima, K. Sato, Y. Izumiya, S. Schiekofer, M. Ito, R. Liao, W. S. Colucci, K. Walsh, 2005, The Journal of clinical investigation 115(8), 2108-18; T. Oka, H. Akazawa, A. T. Naito, I. Komuro, 2014, Circulation research 114(3), 565-71).

Mechanistically, the adaptive response of ECs in pathology has been shown to occur in part in response to release pro-angiogenic factors such as the vascular endothelial growth factor (VEGF) (F. J. Giordano, H. P. Gerber, S. P. Williams, N. VanBruggen, S. Bunting, P. Ruiz-Lozano, Y. Gu, A. K. Nath, Y. Huang, R. Hickey, N. Dalton, K. L. Peterson, J. Ross, Jr., K. R. Chien, N. Ferrara, 2001, Proceedings of the National Academy of Sciences of the United States of America 98(10), 5780-5), angiopoietins (C. Daly, E. Pasnikowski, E. Burova, V. Wong, T. H. Aldrich, J. Griffiths, E. Ioffe, T. J. Daly, J. P. Fandl, N. Papadopoulos, D. M. McDonald, G. Thurston, G. D. Yancopoulos, J. S. Rudge, 2006, Proceedings of the National Academy of Sciences of the United States of America 103(42), 15491-6; S. Y. Schubert, A. Benarroch, J. Monter-Solans, E. R. Edelman, 2011, Arterioscler Thromb Vasc Biol 31(4), 870-5), pro-angiogenic extracellular vesicles (J. A. Dougherty, N. Kumar, M. Noor, M. G. Angelos, M. Khan, C. A. Chen, M. Khan, 2018, Front Physiol 9, 1794) and nitric oxide (R. M. Palmer, D. S. Ashton, S. Moncada, 1988, Nature 333 (6174), 664-6) secreted by CMs.

In turn, ECs and blood vessels, initially thought being exclusively responsible for providing oxygen to the tissue, release a variety of "angiocrine" cytokines and matrix proteins to control cardiomyocyte growth, regeneration and fibrosis in various organs (S. Rafii, J. M. Butler, B. S. Ding, 2016, Nature 529(7586), 316-25; H. G. Augustin, G. Y. Koh, 2017, Science (New York, N.Y.), 357(6353); Y. Manayski, T. Lucas, S. F. Glaser, L. Dorsheimer, S. Gunther, T. Braun, M. A. Rieger, A. M. Zeiher, R. A. Boon, S. Dimmeler, 2018, Circulation research 122(5), 670-677. Hence, communication between ECs and CMs is bi-directional (F. Perbellini, S. A. Watson, I. Bardi, C. M. Terracciano, 2018, Front Cardiovasc Med 5, 143).

In vitro 3D models that accurately recapitulate this complex heterocellular interplay are necessary to bridge the gap between existing in vitro and in vivo models. Several groups have generated cardiac 3D tissue constructs using various types of biodegradable matrixes, scaffolds and different types of strategies to form such constructs (J. J. Kim, L. Hou, N. F. Huang, 2016, Acta Biomater 41, 17-26; M. N. Hirt, A. Hansen, T. Eschenhagen, 2014, Circulation research 114(2), 354-67; D. B. Kolesky, K. A. Homan, M. A. Skylar-Scott, J. A. Lewis, 2016, Proceedings of the National Academy of Sciences of the United States of America 113(12), 3179-84).

The addition of cultured primary or stem cell-derived ECs has also led to reports of vascularized 3D tissues (O. Caspi, A. Lesman, Y. Basevitch, A. Gepstein, G. Arbel, I. H. Habib, L. Gepstein, S. Levenberg, 2007, Circulation research 100 (2), 263-72; M. T. Valarmathi, J. W. Fuseler, J. M. Davis, R. L. Price, 2017, Front Cell Dev Biol 5, 2; A. Moretti, K. L. Laugwitz, T. Dorn, D. Sinnecker, C. Mummery, 2013, Cold Spring Harb Perspect Med 3(11); W. H. Zimmermann, C. Fink, D. Kralisch, U. Remmers, J. Weil, T. Eschenhagen, 2000, Biotechnol Bioeng, 68(1), 106-14).

However, due to the lack of vascular network development and endothelial cell maturation in these models, they provide limited insight on the dynamics and heterocellular interplay of the angiogenic response to physiologic or pathologic stimuli. Thus, 3D cardiac tissue models that attempt to mimic heterocellular interactions under pathophysiological conditions are sparse and largely fail to accurately mimic native tissue cellular composition, morphology, metabolism and function, and stress response (T. Chen, G. Vunjak-Novakovic, 2018, Regen Eng Transl Med 4(3), 142-153).

In this example, a 3D cardiac triculture approach was used to study heterocellular cross-talk in the context of physiologic and pathophysiologic (hypoxia, pro-fibrotic/-inflammatory) stimulation. These cardiac tissue mimetics (CTMs) comprise of CMs, ECs and FBs and display cellular maturation and well-developed tissue vascularization. CTMs generated using our methodology respond to cardiac stressors and display changes in metabolism, growth and vascularization resembling, in part, native tissue response. In this setting, the intercellular cross-talk between CM, EC and FB evoked by pathophysiologic stimuli was further explored. Taken together, the results shown here demonstrate the utility of CTMs as a robust in vitro model for heterocellular cross-talk studies in the settings of myocardial tissue homeostasis and disease, including studies of drug cardiotoxicity.

Materials and Methods

Cell Isolation

Mated female Sprague Dawley rats were obtained from Charles River (Sulzfeld, Germany) and Janvier (Le Genest Saint-Isle, France). Rats were sacrificed by cervical dislocation and hearts were obtained from P1 and P2 rat pups. The obtained hearts were then transferred into Hank's buffered saline solution ($-Ca^{2+}/-Mg^{2+}$) containing 0.2% 2,3-Butanedione monoxime (short BDM; Sigma-Aldrich; B0753-25G) and were cut into small pieces. Tissue dissociation was performed in 5 mL of a commercial available enzyme mix (Neonatal Heart Dissociation Kit, mouse and rat by Miltenyi Biotec GmbH). To dissociate the solid heart tissue, genteMACS™ Dissociator (Miltenyi Biotec GmbH) with the pre-programmed program m_neoheart_01_01 was used after four times 15 minutes of digestion at 37° C. Cardiomyocytes and fibroblasts of the digested heart suspension were pelleted by centrifugation (80×g, 5 minutes), resuspended in plating medium (DMEM high glucose, M199 EBS (both without L-Glutamine by BioConcept), 10% horse serum, 5% fetal calve serum, 2% L-glutamine and penicillin/streptomycin) and plated for 1 hour and 40 minutes in 6 cm cell culture dishes (Greiner Bio-One GmbH) at 37° C. and 5% $CO_2$ at humidified atmosphere. The fact that fibroblasts are able to attach to uncoated culture dishes, allowed taking cardiomyocytes from the culture supernatant while fibroblasts attached to the culture dish.

Cell Culture

Human umbilical vein endothelial cells (HUVEC) were purchased from Lonza and cultured with endothelial basal medium (EBM™, Lonza) supplemented with 10% fetal calve serum (FCS; Invitrogen), Amphotericin-B, ascorbic acid, bovine brain extract (BBE), endothelial growth factor (EGF), gentamycin sulphate and hydrocortisone (EGM®-singlQuots™ Lonza) at 37° C. and 5% $CO_2$, at humidified atmosphere.

HEK293T cells were cultured with DMEM high glucose Glutamax™ (Initrogen) supplemented with 10% FCS (Invitrogen) and penicillin/streptomycin (Roche) at 37° C. and 5% $CO_2$, at humidified atmosphere. Isolated cardiac rat fibroblasts and cardiomyocytes were cultured with maintenance medium (DMEM high glucose, M199 EBS (both without L-Glutamine by BioConcept), 1% horse serum, 2% L-glutamine and penicillin/streptomycin) at 37° C. and 5% $CO_2$ at a humidified atmosphere. Before culturing cardiomyocytes, cell culture dishes had been coated with collagen (AdvanceMatrix; 5005-100ML) for 10 minutes at 37° C. Cell detachment was performed with 0.25% trypsin (Life Technologies), which was incubated for 2 minutes at 37° C. and 5% $CO_2$ and neutralised with fully supplemented EBM™ medium or plating medium. The cell number was determined using the cell counter NucleoCounter® (ChemoMetec), as described in the manufacturer's protocol or by using Neubauer improved hemocytometer (Peqlab).

Lentiviral GFP Expression

Lentiviral particles were generated by transfecting HEK293T cells with the packing plasmids pCMVΔR8.91 and pMD2.G as well as the GFP-ORF carrying plasmid SEW. In brief, HEK293T cells were cultured in a T175 flask (Greiner Bio-One GmbH) until reaching a confluence of 70%. A transfection mix of 100 µL Opti-MEM (Life Technologies GmbH) containing 6 µg of pCMVΔR8.91, 2 µg of pMD2.G and 8 µg of SEW was prepared that pre-incubated for 20 minutes at room temperature before adding to the HEK293T culture. After 4 days of culturing, culture supernatant was cleared from cellular debris by centrifugation (500×g, 5 minutes, 4° C.) and concentrated 40× using the Amicon® Ultra-15 centrifugal units 100 KD (4 times, 2500×g, 30 minutes, 4° C.) by Millipore (UCF910024). For GFP expression, 300,000 HUVECs were seeded in a T25 flask (Greiner Bio-One GmbH) and virus-containing supernatants were titrated on HUVECs for 24 hours to determine the titres needed to transduce >95% of the cells. After 7 days of culturing, GFP expression was confirmed by fluorescence microscopy.

CTM Formation

Primary rat cardiomyocytes (CM), cardiac rat fibroblasts (FB) and HUVEC were used for CTM formation. In brief, droplets of 30 µL plating medium containing 32,000 CMs and 6,400 FBs were cultured as hanging drops at 37° C. and 5% $CO_2$ at humidified atmosphere to form cardiac spheroids. After 4 days, cardiac spheroids were collected and coated in plating medium supplemented with either no additional matrix proteins, 1:500 fibronectin (Sigma-Aldrich; F0895) or 1:10 growth factor reduced Matrigel® (Corning; 356230) for 1 hour at 4° C. The coated spheroids were then singularized in 96-well plates (ultra-low attachment U-bottom plate by Corning; 7007) with 50 µL plating medium per well. At least 4 hours after spotting, 10,000 HUVECs in 50 µL fully supplemented EBM™ were added to each well. HUVECs were allowed for 24 hours to attach to the cardiac spheroids (spheroids containing CM, FB and HUVEC are referred as CTMs from here after) and medium was changed to maintenance medium containing fully supplemented EBM™ (50%:50%) containing either no treatment, 200 µM phenylephrine (short PE; Sigma-Aldrich; P6126-5G), PE+0.1% DMSO, PE+1 µM Propranolol (Sigma-Aldrich; P0884-5G), PE+50 µM Metoprolol (Sigma-Aldrich; 80337-100MG) or PE+1:50 neutralizing VEGF antibody (R&D Systems; AF564). CTMs were cultures for 10 days by refreshing the medium with the respective stimulus (no stimulus, PE, antibodies or β-blockers) every second day. Vascularisation was determined using the Leica TCS SP8 confocal microscope and the LAS X software by measuring the accumulated HUVEC-sprout length, mean HUVEC-sprout thickness and mean number of branch points within the vascular network.

Contractility Measurement

Spontaneous CTM contraction was determined by counting the number of beats per minute of at least 6 CTMs per condition using a computer-assisted microscope using Axiovision 4.5 (Zeiss). For pacing experiment, every single CTM was transferred into a 35/10 mm cell culture dish (Greiner Bio-One) and incubated at 37° C. and 5% $CO_2$ for 30 min. The CTM was then electrically paced at 1 Hz and 15 V with a Myopacer field stimulator (IonOptix). The data were collected and analysed with the Myocyte Calcium and Contractility system (IonOptix).

Size Measurement

CTM diameter was measured after 10 days of culturing using a computer-assisted bright field microscope with the Axiovision 4.5 software (Zeiss).

Cryosections of CTMs were stained with DAPI, anti-α-Actinin and Alexa Flour conjugate of Wheat-Germ-Agglutinin. Area of 100 cardiomyocytes per condition were quantified using ImageJ.

Seahorse Assay

The Agilent Seahorse XFe96 spheroid microplate was coated with Poly-D Lysine 100 µg/mL following the manual instruction. 1×KHB medium (111 mM NaCl, 4.7 mM KCl, 2 mM $MgSO_4$, 1.2 mM $Na_2HPO_4$, 2.5 mM D-Glucose, 0.5 mM carnitine) supplemented with 6 mM D-Glucose was prepared prior the experiment. CTMs were washed twice with KHB medium and every single CTM was then transferred directly into each well of XFe96 spheroid microplate containing 175 µL of KHB medium. CTMs were centered into the micro-chamber and incubated at 37° C. in non-$CO_2$ incubator for 1 hour. The Seahorse XF Cell Mito Stress Test was performed using sequential injection of Oligomycin (2.5 µM, Sigma, O4876), FCCP (2.0 µM, Sigma, C2920) and Antimycin A (0.5 µM, Sigma, A8674) following a 3-min-mixing and 3-min-measuring cycles for up to 2 hours. Oxygen consumption rate (OCR) and Extracellular acidification rate (ECAR) were measured and calculated using Seahorse XFe96 Analyzers (Agilent Technologies).

Fluorescence Immunohistochemistry

CTMs were collected and fixed with 4% Histofix (Carl-Roth GmbH & Co. KG) for 1 hour at room temperature. Whole CTMs as well as cryo-sections of CTMs were used for fluorescence immunohistochemistry.

In case of whole mount stainings, CTMs were permeabilized with 0.2% Triton® X-100 in PBS for 1 hour at room temperature followed by blocking with 5% horse serum (Sigma-Aldrich) in PBS for 30 minutes at room temperature. Primary antibodies (see Table 1) were diluted 1:200 in 5% horse serum and incubated over night at 4° C. Before using the secondary antibody (see table below), CTMs were washed three times with PBS containing 1% Tween 20 and 0.002% Triton® X-100 (referred as PBT from here after) for 20 minutes at room temperature. Secondary antibodies (1:500) and DAPI (1:1000; Carl-Roth GmbH & Co. KG) were diluted in 5% horse serum together and incubated for 4 hours at room temperature in the dark. After washing CTMs again three times with PBT, CTMs were mounted with ProLong™ Gold Antifade Mountant (Thermo Fisher Scientific; P36934) and analysed using the Leica TCS SP8 confocal microscope. Cryo-sections were prepared by embedding fixed spheroids in O.C.T medium (Tissue-Tek), snap-freezing them in liquid nitrogen and cutting them in 10 µm thick sections. Sections were permeabilized and blocked for one hour in 0.1% Triton® X100 (in PBS+BSA). Primary antibody incubated with the sections diluted 1:50-1:100 in 1 mM $MgCl_2$, 1 mM $CaCl_2$, 0.1 mM $MnCl_2$, 1% Triton® X-100 or 0.2% saponin over night at 4° C. The next day, sections were washed trice with 0.1% Triton® X100/PBS or 0.2 saponin (five minutes each) and incubated with the secondary antibody diluted 1:200 in 0.1% Triton® X100 or 0.2% saponin (in PBS) for one hour at room temperature in the dark. Finally, sections were washed again trice with 0.1% Triton® X100/PBS or 0.2% saponin and mounted with mounting medium containing DAPI or Hoechst 33342. Endothelial cells were stained with Isolectin B4.

Second-Harmonics Generation

The second-harmonics generation imaging was performed on an upright spectral multiphoton microscope (Leica TCS SP8 DIVE, non-descanned spectral detectors, objective HC IRAPO L 25x/1.00 W) using 10 μm thick CTM sections. A 1045 nm laser was used for SHG and the signal was detected with a PMT and a detection window from 517 nm to 527 nm. A second detection window was used to record autofluorescence for comparison (552 nm to 565 nm).

Sirius Red Staining

Sirius red staining was used to determine collagen deposition and fibrosis in paraffin sections of young versus aged mice hearts. In a first step, the paraffin sections were deparaffinised with xylene (twice 10 minutes) and an ethanol series of 100%, 95%, 80%, 70% and 50% ethanol (5 minutes each step), before washing the sections with water and PBS (5 minutes each step). In a second step, a 0.1% Picrosirius Red solution was prepared by solving 0.5 g Sirius Red (Waldeck GmbH) in 500 mL picric acid (Sigma-Aldrich) that incubated with the deparaffinised sections for 1 hour. After washing two times with acidified water, the sections were dehydrated with 100% ethanol, cleared with xylene and mounted with Pertex (Medite)

Transmission Electron Microscopy

Mature CTMs were washed once with PBS and fixed in 4% formaldehyde in 0.1 M phosphate buffer over night at 4° C. After postfixing with 1% osmium tetroxide for 1 hour at room temperature, CTMs were washed twice with 0.1 M phosphate buffer and incubated over night at 4° C. in 2% aqueous uranyl acetate (Polysciences). CTMs were washed twice with water and dehydrated in an ethanol series (30, 50, 70, 80, 90, 96, and 99% [vol/vol], 10 minutes each) and embedded in Epon (Serva). Ultrathin sections were inspected in the transmission electron microscope (EM 912a/b; Zeiss) and images were recorded at a slight underfocus using a cooled 2,000- by 2,000-pixel slow-scan charge-coupled device (CCD) camera (SharpEye/TRS) and the iTEM package (Olympus Soft Imaging Solutions).

Generating Cardiomyocyte-/Fibroblast-Conditioned Media

To obtain cardiomyocyte- and fibroblast-conditioned medium, 200,000 isolated cardiac fibroblasts and 250,000 isolated cardiomyocytes were seeded in 24-well plates (Greiner Bio-One GmbH) and cultured with 0.5 mL of maintenance medium containing no further supplement, 200 μM PE, PE+0.1%, DMSO, PE+1 μM Propranolol or PE+50 μM Metoprolol. After 72 hours, cell culture supernatants were centrifuged (500×g, 5 minutes) to deplete dead cells and stored at −80° C.

Spheroid-Based Angiogenic Sprouting Assay

Endothelial cell sprouting was studied by in vitro spheroid-based angiogenesis assays. In brief, HUVECs were trypsinized and transferred into a mixture of fully supplemented EBM™ and methylcellulose (80%:20%). 400 HUVEC in 100 μL per well were distributed to a U-bottom 96-well plate (Greiner Bio-One GmbH) and cultured at 37° C. and 5% $CO_2$ at humidified atmosphere. After 24 hours, spheroids were collected, pelleted (200×g, 3 minuted), resuspended in methylcellulose supplemented with FCS (80%:20%) and embedded in a collagen Type-I gel (Corning; 354236). HUVEC spheroids were then either cultured with fully supplemented EBM (+/−VEGF (50 ng/mL; BioLegend; 583702) or +/−PE (200 μM)), maintenance medium or conditioned cell culture medium. After 24 hours, sprouting was determined by measuring the cumulative sprout length of ten randomly chosen spheroids using a computer-assisted microscope using Axiovision 4.5 (Zeiss).

Tube Formation Assay

Tube formation assay was performed as previously described (J. U. G. Wagner, E. Chavakis, E. M. Rogg, M. Muhly-Reinholz, S. F. Glaser, S. Gunther, D. John, F. Bonini, A. M. Zeiher, L. Schaefer, M. J. Hannocks, R. A. Boon, S. Dimmeler, 2018, Arterioscler Thromb Vasc Biol 38(5), 1170-1177). Briefly, in vitro tube formation was performed with $2 \times 10^4$ HUVECs cultured in 100 μL of fully supplemented EBM™ in 96-well plates (Greiner Bio-One GmbH) that had been coated with 100 μL Matrigel® (Corning; 356234). Tube formation was determined after 24 hours by measuring the accumulated tube length in three randomly chosen microscopic fields with a computer-assisted microscope using Axiovision 4.5 (Zeiss).

RNA Isolation and Quantification

CTMs, heart tissues of neonatal pups and adult rats were collected into Lysing Matrix D tubes (MP Biomedical; 6913-500) and 700 μL of TriFast (VWR; 3010-100ML) was added. Cells and tissues were homogenized 3 times for 20 s following by 5 min. pause on ice. Total RNA was purified with the Direct-zol™ RNA MicroPrep kit (Zymo Research; R2060). The RNA concentration was determined by measuring absorption at 260 nm and 280 nm with the Nano-Drop® ND 2000-spectrophotometer (Peq Lab).

cDNA Synthesis and Quantitative Polymerase Chain Reaction (qPCR)

cDNA was synthesized from 500 ng of total RNA with EcoDry Premix RNA to cDNA (Random Hexamers) (Clontech; 639546). qPCR was performed using 10 μL of iTaq™ Universal SYBR® Green Supermix (Bio-Rad; 172-5124), 1 μL of 10 μmol/L forward and reverse primer each, 1 μL of cDNA template and 7 μL of $H_2O$ in a Bio-Rad CFX96 Connect Real-Time PCR system. Primers using to quantify mRNA expression were ordered from Metabion (Table 2).

Bulk RNA Sequencing

Bulk RNA sequencing was performed as previously described (J. U. G. Wagner, E. Chavakis, E. M. Rogg, M. Muhly-Reinholz, S. F. Glaser, S. Gunther, D. John, F. Bonini, A. M. Zeiher, L. Schaefer, M. J. Hannocks, R. A. Boon, S. Dimmeler, 2018, Arterioscler Thromb Vasc Biol 38(5), 1170-1177). In brief, RNA and library preparation integrity were verified with a BioAnalyzer 2100 (Agilent) or LabChip Gx Touch 24 (Perkin Elmer). 100-200 ng of total RNA was used as input for Truseq Stranded Total RNA Library preparation following the low sample protocol (Illumina). Sequencing was performed on the NextSeq500 instrument (Illumina) using v2 chemistry, resulting in minimum of 30M reads per library with 1×75 bp single end setup. Demultiplexing and adapter removal was performed by bcl2fastq software (Illumina) and resulting raw reads were assessed for quality, adapter content and duplication rates with FastQC. Fastx_trimmer was user to trim the first 5 bp. Trimmed and filtered reads were aligned versus the Ensembl mouse genome version mm10 (GRCm38) using STAR 2.4.0a with the standard parameters (A. Dobin, C. A. Davis, F. Schlesinger, J. Drenkow, C. Zaleski, S. Jha, P. Batut, M. Chaisson, T. R. Gingeras, 2013, Bioinformatics (Oxford, England) 29(1), 15-21). The number of reads aligning to genes was counted and compared with Ciffdiff version 2.2.1 (Y. Liao, G. K. Smyth, W. Shi, 2014, Bioinformatics (Oxford, England) 30(7), 923-30). The Ensemble annotation was enriched with UniProt data (release Jun. 6, 2014) based on Ensembl gene identifiers (Activities at the Universal Protein Resource (UniProt)).

Lactate Dehydrogenase Assay

Media of CTMs were replaced completely with fresh medium 24 h before performing the assays. After 24 h, supernatants were collected and in maximum 50 µL of each supernatant was used for every measurement with the Lactate Dehydrogenase Activity Kit (Sigma; MAK066). To determine enzyme activity, the absorbance at 450 nm ($A_{450}$) was measured with the CLARIOstar plate reader (BMG Labtech). LDH activity were calculated following the manufacturer's instruction.

Toxicity Assay

CTMs that incubated with 0.2% $H_2O_2$ in medium for 30 minutes at 37° C. served as positive control. In the second step, CTMs were washed three times with PBS, fixed with 4% Histofix (Carl-Roth GmbH & Co. KG) for 1 hour at room temperature and stained against phospho-Histone H2A.X following immunohistochemistry staining procedure (please see section Fluorescence immunohistochemistry).

Injury Assay

CTMs were cultured as described in the section CTM formation in the presence of PE to reach full maturation. After 10 days of PE-treatment, inflammation was mimicked using culture medium with 10 ng/mL transforming growth factor β2 (short: TGF β2; R&D Systems; 302-B2) and PE as well as FGF-, EGF- and BBE-depleted EBM™ instead of fully supplemented EBM™ for 72 hours at 37° C. and 5% $CO_2$. Culturing mature CTMs at 0.1% $O_2$ for 72 hours was used as ischemic model. Mature CTMs that were kept in PE-supplemented medium only, were used as control condition. After culturing mature CTMs under both injury model conditions, CTM cryo-sections or whole CTMs were used for immunofluorescence staining or SHG.

Statistical Analysis

Data are represented as mean and error bars indicate standard deviation (SD). Data were assessed statistically (Shapiro-Wilk and Kolmogorov-Smirnov test) for normality and statistical power was determined for Gaussian distributed data, using two-sided, unpaired T-test for two-group comparison. For comparisons of more than two groups, multiple group ANOVA with a post hoc Bonferroni test was used. For data that were not Gaussian distributed, a Kruskal-Wallis test with a multiple group Dunn's correction was used for multiple group comparison. For comparing two groups, a Mann-Whitney test was used. n.s.=not significant; *$p<0.05$; $p<0.01$; *$p<0.001$ and ****$p<0.0001$.

Results

Establishment of Vascularized 3D CTMs

To establish the 3D culture, cardiomyocytes (CM) and cardiac fibroblasts (FB) were isolated from neonatal rat hearts. The respective fractions were separated by pre-plating and thereafter mixed at a ratio of CM:FB 5:1. The mixed cells were left to form spheroids in hanging drops containing 32000 CMs and 6400 FBs for 4 days. The spheroids were then collected and distributed individually into wells of Ultra-low-attachment (ULA) plates. GFP-transduced human umbilical vein endothelial cells (HUVEC) were added into each well with the ratio of CM:HUVEC of 3:1 to allowing monitoring of vessel growth. The cardiac tissue mimetics (CTMs) were subsequently treated with phenylephrine (PE) every second day and harvested 10 days after for further assays. A schematic overview of the protocol is shown (FIG. 3).

It was assessed if CTMs respond to physiologic hypertrophic stimuli with PE, an α-adrenergic receptor agonist (B. C. Jensen, T. D. O'Connell, P. C. Simpson, 2011, J Mol Cell Cardiol 51(4), 518-28). Indeed, stimulation with PE significantly increased CTM growth (FIG. 4) and cardiomyocyte maturation and hypertrophy as evidenced by increased sarcomeric α-actinin staining, enhanced sarcomere organization and density, and the shift towards adult-type titin isoform expression (C. A. Opitz, M. C. Leake, I. Makarenko, V. Benes, W. A. Linke, 2004, Circulation research 94(7), 967-75; C. A. Opitz, W. A. Linke, 2005, J Muscle Res Cell Motil 26(6-8), 333-42) (FIGS. 5-7).

Consistent with the physiologic effects of short term cardiac PE stimulation (B. C. Jensen, T. D. O'Connell, P. C. Simpson, 2011, J Mol Cell Cardiol 51(4), 518-28), a significant increase in contractile amplitude was detected in paced CTMs (FIGS. 8 and 9). Further, as observed in native myocardium, PE stimulation led to increased oxidation metabolism, mitochondrial function and mitochondrial density, concomitant with a reduction in glycolysis (FIGS. 9-12). These phenotypic changes in CTM adrenergic signaling response, metabolism and contractility are further reflected in the enrichment and elevated expression of these KEGG gene sets upon PE stimulation (FIG. 33).

To ascertain that the culture conditions with PE did not cause general cell death, PE treated and untreated CTMs were stained for phosphorylated histone H2AX (γH2AX), a DNA double strand break marker of genomic instability and apoptosis (FIG. 34) (S. P. Scott, T. K. Pandita, 2006, J Cell Biochem 99(6), 1463-75). In parallel, detection of extracellular lactate dehydrogenase (LDH), as a marker of necrosis (J. E. Barker, E. C. McFarland, 1988, J Cell Physiol 135(3), 533-8), failed to reveal differences compared to control untreated CTMs (FIG. 35). Taken together, the data demonstrates that CTMs generated with according to the method of the invention are viable, functional, metabolically active and responsive to physiologic stimuli.

PE Stimulation Augments Vascularization of CTMs

Consistent with previous reports of increased capillary density after in vivo PE stimulation (H. Chen, D. Liu, Z. Yang, L. Sun, Q. Deng, S. Yang, L. Qian, L. Guo, M. Yu, M. Hu, M. Shi, N. Guo, 2014, Endocr Relat Cancer 21(5), 783-95; D. Chalothorn, H. Zhang, J. A. Clayton, S. A. Thomas, J. E. Faber, 2005, Am J Physiol Heart Circ Physiol 289(2), H947-59), treatment of CTMs with PE led to significantly augmented vascularization, increased tube length, branch points and tube thickness (FIG. 13, B, FIG. 36). Furthermore, indicative of active neoangiogenesis, more filopodia were detected in PE-stimulated CTMs (FIG. 13).

To determine if increased vascularization was mediated by direct action of PE on the ECs, 3D monocultures of HUVECs were generated and these spheroids were treated with an identical concentration of PE. Surprisingly, PE stimulation did not impact EC spheroid growth, while stimulation with the pro-angiogenic Vascular endothelial growth factor (VEGF) as positive control, significantly increased vascular network growth and branching (FIG. 15). These data suggest that increased vascularization induced by PE in the 3D triculture CTM is likely a consequence of cross-talk between cells contained within the CTM (FIG. 16), and not due to direct function of PE on ECs.

To test this hypothesis, conditioned medium of cardiac CMs or FBs monocultures was collected and applied to HUVEC spheroids (FIG. 17, FIGS. 37 and 38). CM-conditioned and FB-conditioned medium displayed a tendency for increased EC sprout formation at baseline by about 1.5 (CM) and 3-fold (FB), but the difference failed to achieve statistical significance (FIG. 17, FIG. 38). However, additional stimulation of CM cultures with PE prior to conditioned medium collection did significantly increase the capacity for EC growth and sprouting (FIG. 17), whereas no effect was observed from conditioned medium of PE stimulated FB (FIG. 38).

As pro-hypertrophic stimulation of CMs has been shown to induce VEGF release and can mediate an adaptive response of ECs (D. Chalothorn, H. Zhang, J. A. Clayton, S. A. Thomas, J. E. Faber, 2005, Am J Physiol Heart Circ Physiol 289(2), H947-59), the contribution of VEGF was tested by adding neutralizing antibodies to the CM-conditioned medium. Indeed, neutralizing VEGF antibodies reduced the pro-angiogenic effects of conditioned medium from PE-stimulated CMs (FIG. 18). Consistent with this finding, treatment of 3D CTMs with neutralizing VEGF antibodies also significantly reduced vascularization (FIG. 19). These data suggest that the in vitro 3D CTM model according to the invention recapitulates previous in vivo studies demonstrating a cross-talk between CMs and ECs via VEGF (J. A. Dougherty, N. Kumar, M. Noor, M. G. Angelos, M. Khan, C. A. Chen, M. Khan, 2018, Front Physiol 9, 1794; N. Nuamnaichati, V. H. Sato, P. Moongkarndi, W. Parichatikanond, S. Mangmool, 2018, Life Sci 193, 257-269).

β-Receptor Antagonist Reduces PE-Stimulated Vascularization

As PE stimulation was observed to augment CTMs contraction (FIG. 8), it was asked if PE-induced mechanical activation of ECs could also contribute to the increase in CTM vascularization. To uncouple the contribution of contractile activation on angiogenesis, CTMs were incubated with the β-adrenergic receptor antagonists Propranolol and Metoprolol to inhibit CTM contraction (R. K. Amanfu, J. J. Saucerman, 2014, Mol Pharmacol 86(2), 222-30; B. N. Prichard, 1982, Br J Clin Pharmacol 13(1), 51-60. Propranolol and Metoprolol reduced the frequency of CTM contraction (FIG. 20), whereas Propranolol additionally diminished PE-induced hypertrophic growth (FIG. 39). Importantly, inhibition of CTM contraction significantly reduced PE-induced vascularization (FIGS. 21 and 22). As previous studies have reported a direct effect of β-adrenergic receptor antagonists on EC growth and vascular network expansion (H. Chen, D. Liu, Z. Yang, L. Sun, Q. Deng, S. Yang, L. Qian, L. Guo, M. Yu, M. Hu, M. Shi, N. Guo, 2014, Endocr Relat Cancer 21(5), 783-95; D. Sorriento, B. Trimarco, G. Iaccarino, 2011, Transl Med UniSa 1, 213-28; Y. Ji, S. Chen, K. Li, X. Xiao, S. Zheng, T. Xu, 2013, Cell Div 8(1), 1), HUVEC monocultures were treated in a tube formation assay with Propranolol and Metoprolol. However, despite repeated attempts, a direct impact of Propranolol and Metoprolol on EC tube formation and growth could not be detected (FIGS. 23 and 24). Finally, CM monocultures were cultured with PE and a combination of PE with Propranolol or Metoprolol. Collected supernatants were used as stimulus for HUVEC spheroids to exclude β-blocker induced secretomic changes. Interestingly, no significant alterations on endothelial sprouting was found, indicating the role of mechanical stress induced angiogenesis (FIG. 25).

Pathophysiological Stressors Interfere with Cellular Cross-Talk in 3D CTMs

Next, it was assessed whether 3D CTMs may be used as models to study stress related changes in cellular cross-talk. Therefore, transforming growth factor β2 (TGF β2), an established inducer of endothelial-mesenchymal transition (EndMT) and cardiac fibrosis, and hypoxia (0.1%) as a model of ischemia, were used, both in combination with PE. The two stimuli were applied on mature CTMs (after 10 days of PE treatment) for 3 days.

TGF β2 led to a slightly increased CTM vascularization (FIGS. 26, 27). Vimentin fluorescence staining of mature CTMs in the presence or absence of TGF β2 revealed evidence of cardiac fibroblast activation (FIG. 28) as well as induced collagen deposition as visualized by second-harmonics generation (SHG) (L. Mostaco-Guidolin, N. L. Rosin, T. L. Hackett, 2017, Int J Mol Sci 18(8)) and Sirius Red staining (FIGS. 29-31). Since TGF β2 is a well-known EndMT inducer, CTM cross-sections were screened for ECs that were positive for vimentin, a commonly used FB marker (L. Mostaco-Guidolin, N. L. Rosin, T. L. Hackett, 2017, Int J Mol Sci 18(8)). Interestingly, single ECs expressing vimentin were found suggesting that EndMT is occurring in pro-inflammatory CTMs (FIG. 32, FIG. 40). Furthermore, unlike TGF β2, severe hypoxia 0.1% significantly reduced CTM vascular network (FIGS. 26, 27) and increased collagen deposition (FIGS. 29-31), indicating that this model accurately reflects changes observed in the native myocardium in response to severe myocardial hypoxia (N. Farbehi, R. Patrick, A. Dorison, M. Xaymardan, V. Janbandhu, K. Wystub-Lis, J. W. Ho, R. E. Nordon, R. P. Harvey, 2019, Elife 8).

Discussion

This example reports a cardiac mimetic platform for the study of EC communication with CM under physiological and pathophysiological conditions. It is demonstrated that physiological pro-hypertrophic stimuli augment vascularization of the CTMs at least in part by inducing VEGF-release by CM. The developed model additionally enabled dissection of cardiac response to ischemia and pro-fibrotic stress conditions.

The cardiac tissue mimetic according to the invention recapitulates cardiac responses to physiologic and pathologic stimuli at the level of tissue growth, metabolism and function. This is particularly striking in the response of the CTMs to PE, where a significant increase in CTM growth was observed, concomitant with the switch in metabolism from glycolysis to glucose oxidation (FIGS. 9-11). This switch reflects the dynamics and plasticity of the cardiac tissue mimetic according to the invention, which is further reflected at the gene expression level (FIGS. 33A, 33C). This mimicry of native tissue response was also observed with respect to cardiac function and contraction. In this regard, as reported in vivo, the CTM demonstrated an increase in the amplitude of contraction, thus reflecting a physiologic or adaptive hypertrophic response to PE stimulation. These changes in contractility were also reflected at the gene expression level (FIGS. 33A, 33D).

Although 3D cardiac tissue engineering models have been previously used for therapeutic cardiac tissue engineering or drug testing (21, 41-45), these studies did not address the recapitulation of more complex, cellular communication-dependent in vivo phenotypes with their models. The use of heterogenic cell mixtures, pluripotent cells or the addition of ECs from different sources has allowed the formation of vascularized tissue constructs. Despite the well-established importance of cellular interactions, few studies have used the 3D tissue engineering models for mechanistic studies. Here a more in-depth elucidation of the role of cardiac microenvironment is provided, particularly the impact of heterocellular cross-talk with respect to EC-CM interactions. Coating the pre-made spheroids with ECs allowed to study the kinetics of angiogenic sprouting, which includes visualization of tip cells with filopodia. The tissue model further recapitulated the established pro-angiogenic response induced by cardiac hypertrophy and confirmed the importance of VEGF for mediating this effect. Of note, inhibition of VEGF did not fully prevent the induction of vascularization induced by PE suggesting that additional growth factors, cytokines, matrix proteins and/or mechanical factors contribute to the observed effect. Interestingly, the pro-angiogenic effect of PE was dependent on ⊕1/β2 receptor and likely involved mechanical activation mediated by the contraction of CMs. Whether this effect occurs directly by mechanosensing of ECs or is due to an indirect effect mediated by a change in CM paracrine effects remains to be further elucidated. However, first supernatant experiments of CMs treated with PE and β-blockers showed no anti-angiogenic effect compared to CMs stimulated with PE alone, giving rise that mechanosensing of ECs induce sprouting. Of note, a direct pro- and anti-angiogenic effect of PE and β-blockers is excluded—at the concentrations used in the CTM experiments on EC sprouting.

Second, the cardiac tissue mimetic is used to study pathophysiological conditions as they occur in cardiac ischemia and during cardiac remodeling after infarction. It was shown that treatment of the CTMs with the prototypical inducer of a pro-fibrotic response, TGF β2, indeed augments collagen deposition in the CTMs. ECs seemed to increase sprouting even if this effect failed to reach significance. In addition, ECs undergoing EndMT were found in CTMs under pro-inflammatory conditions, indicating that the cardiac tissue mimetic might also be used for studying EndMT in terms of cell-cell communication. Combinations of TGF β2 with inflammatory cytokines may be an option to simulating pathophysiological conditions during cardiac remodeling and chronic heart failure. In addition, it was shown that additional hypoxia exposure led to the induction of cell death, reduced contraction and increased collagen deposition, thus accurately reflecting changes in myocardial damage and dysfunction as result of severe ischemia. Taken together, these data indicate that CTMs could serve as a robust 3D in vitro system to mimic severe myocardial ischemia and to potentially be utilized to identify efficacious pharmacological agent for therapy.

In conclusion, such a model might be used for testing therapeutic modalities that go beyond targeting CM intrinsic functions such as calcium handling. Studying the vasculature may also provide a mean to determine putative detrimental side effects of therapeutic strategies on vascular growth under physiological stress responses. Finally, the knowledge acquired with such models might also be fundamental to develop novel therapeutics with specific biological targets for treatments of patients with heart disease.

TABLE 1

List of antibodies.

| Antibody | Company |
|---|---|
| Wheat Germ Agglutinin, Alexa Fluor™ 488 conjugate | Thermo Fischer (W11261) |
| anti-Phospho-Histone H2A.X (Ser139) (20E3) Rabbit mAb | Cell Signaling (9718S) |
| anti-VE-Cadherin antibody Rabbit | Cell Signaling (2500S) |
| anti-α-Actinin (Sarcomeric) antibody (clone: EA-53) Mouse mAb | Sigma-Aldrich (A7811) |
| Donkey anti-Mouse IgG (H + L) Cross-Adsorbed Antibody, Alexa Fluor 647 | Invitrogen (A31571) |
| F(ab')2-Goat anti-Mouse IgG (H + L) Cross-Adsorbed Antibody, Alexa Fluor 488 | Invitrogen (A11017) |
| F(ab')2-Goat anti-Rabbit IgG (H + L) Cross-Adsorbed Antibody, Alexa Fluor 488 | Invitrogen (A11070) |
| F(ab')2-Goat anti-Rabbit IgG (H + L) Cross-Adsorbed Antibody, Alexa Fluor 647 | Invitrogen (A21246) |
| Goat anti-Mouse IgG (H + L) Cross-Adsorbed Antibody, Alexa Fluor 568 | Invitrogen (A11004) |
| Goat anti-Rat IgG (H + L) Cross-Adsorbed Antibody, Alexa Fluor 488 | Invitrogen (A11006) |
| Goat Anti-Vimentin antibody | Merck (AB1620) |
| Goat anti-Tagln antibody | Abcam (ab10135) |
| Anti-ATP5A antibody [15H4C4] | Abcam (ab14748) |
| Donkey anti-Goat IgG (H + L) HCross-Adsorbed Antibody, Alexa Fluor Plus 555 | Invitrogen (A32816) |
| Rabbit anti-collagen III antibody | Abcam (ab7778) |
| Biotinylated Isolectin B4 | Vector-Linaris (B1205) |
| Strepavidin Alexa Fluor 555 | Invitrogen (A32355) |

TABLE 2

List of primers used

| Primer | Forward | Reverse |
|---|---|---|
| Total Titin | CCA AGC TCA CTG TGG GAG AAA (SEQ ID 6) | GCT ACT TCC AAG GGC TCA ATT C (SEQ ID 7) |
| N2B | CCA ACG AGT ATG GCA GTG TCA (SEQ ID 8) | TGG GTT CAG GCA GTA ATT TGC (SEQ ID 9) |
| N2BA-2 | CCA ACG AGT ATG GCA GTG TCA SEQ ID 10) | ACT ACA GGC GGA AAG CTA CTA AAA AC (SEQ ID 11) |

The invention claimed is:

1. A method for generating a cardiac tissue mimetic, comprising the steps of
   a. providing cardiomyocytes (CM),
   b. providing fibroblasts (FB),
   c. mixing said cardiomyocytes (CM) and said fibroblasts (FB) at a ratio from 2.5:1 to 10:1, thereby providing a first mixture,
   d. incubating said first mixture as a hanging drop culture at 35° C. to 39° C. in a medium promoting growth of cardiomyocytes for 3 days to 6 days and/or incubating at 35° C. to 39° C. for 3 days to 6 days the hanging drop culture mixture in a well of a cell culture plate coated with a non-adhesive hydrogel, such that a spherical structure forms consisting of said cardiomyocytes and said fibroblasts,
   e. adding endothelial cells (EC) to said spherical structure at a ratio of cardiomyocytes (CM) to endothelial cells (EC) from 1.5:1 to 4:1, thereby providing a second mixture,
   f. incubating said second mixture in a well of a cell culture plate coated with a non-adhesive hydrogel at 35° C. to 39° C. in a 1:1 mixture of a medium promoting growth of cardiomyocytes and a medium promoting growth of vascular endothelial cells for 8 days to 30 days, such that the cardiac tissue mimetic is formed.

2. The method according to claim 1, wherein said cardiomyocytes (CM) and said fibroblasts (FB) are mixed at a ratio of 4:1 to 6:1 of cardiomyocytes (CM) to fibroblasts (FB).

3. The method according to claim 1, wherein said endothelial cells (EC) are added to said spherical structure at a ratio of 1.5:1 to 3:1 of cardiomyocytes (CM) to endothelial cells (EC).

4. The method according to claim 1, wherein said spherical structure comprises a diameter of 50 μm to 500 μm.

5. The method according to claim 1, wherein said cardiomyocytes (CM), said fibroblasts (FB) and/or endothelial cells (EC) are human cells.

6. The method according to claim 1, wherein said cardiomyocytes (CM) and/or said endothelial cells (EC) are differentiated from stem cells.

7. The method according to claim 1, wherein said cardiomyocytes (CM) and/or said endothelial cells (EC) are differentiated from induced pluripotent stem cells (iPS).

* * * * *

SEQUENCE LISTING

```
<160> NUMBER OF SEQ ID NOS: 11

<210> SEQ ID NO 1
<211> LENGTH: 390
<212> TYPE: PRT
<213> ORGANISM: Homo sapiens

<400> SEQUENCE: 1

Met Pro Pro Ser Gly Leu Arg Leu Leu Leu Leu Leu Pro Leu Leu
1               5                   10                  15

Trp Leu Leu Val Leu Thr Pro Gly Arg Pro Ala Ala Gly Leu Ser Thr
            20                  25                  30

Cys Lys Thr Ile Asp Met Glu Leu Val Lys Arg Lys Arg Ile Glu Ala
```

```
                35                  40                  45
Ile Arg Gly Gln Ile Leu Ser Lys Leu Arg Leu Ala Ser Pro Pro Ser
 50                  55                  60

Gln Gly Glu Val Pro Pro Gly Pro Leu Pro Glu Ala Val Leu Ala Leu
 65                  70                  75                  80

Tyr Asn Ser Thr Arg Asp Arg Val Ala Gly Ser Ala Glu Pro Glu
                 85                  90                  95

Pro Glu Pro Glu Ala Asp Tyr Tyr Ala Lys Glu Val Thr Arg Val Leu
                100                 105                 110

Met Val Glu Thr His Asn Glu Ile Tyr Asp Lys Phe Lys Gln Ser Thr
                115                 120                 125

His Ser Ile Tyr Met Phe Phe Asn Thr Ser Glu Leu Arg Glu Ala Val
        130                 135                 140

Pro Glu Pro Val Leu Leu Ser Arg Ala Glu Leu Arg Leu Leu Arg Leu
145                 150                 155                 160

Lys Leu Lys Val Glu Gln His Val Glu Leu Tyr Gln Lys Tyr Ser Asn
                165                 170                 175

Asn Ser Trp Arg Tyr Leu Ser Asn Arg Leu Leu Ala Pro Ser Asp Ser
                180                 185                 190

Pro Glu Trp Leu Ser Phe Asp Val Thr Gly Val Val Arg Gln Trp Leu
            195                 200                 205

Ser Arg Gly Gly Glu Ile Glu Gly Phe Arg Leu Ser Ala His Cys Ser
210                 215                 220

Cys Asp Ser Arg Asp Asn Thr Leu Gln Val Asp Ile Asn Gly Phe Thr
225                 230                 235                 240

Thr Gly Arg Arg Gly Asp Leu Ala Thr Ile His Gly Met Asn Arg Pro
                245                 250                 255

Phe Leu Leu Leu Met Ala Thr Pro Leu Glu Arg Ala Gln His Leu Gln
            260                 265                 270

Ser Ser Arg His Arg Arg Ala Leu Asp Thr Asn Tyr Cys Phe Ser Ser
        275                 280                 285

Thr Glu Lys Asn Cys Cys Val Arg Gln Leu Tyr Ile Asp Phe Arg Lys
290                 295                 300

Asp Leu Gly Trp Lys Trp Ile His Glu Pro Lys Gly Tyr His Ala Asn
305                 310                 315                 320

Phe Cys Leu Gly Pro Cys Pro Tyr Ile Trp Ser Leu Asp Thr Gln Tyr
                325                 330                 335

Ser Lys Val Leu Ala Leu Tyr Asn Gln His Asn Pro Gly Ala Ser Ala
            340                 345                 350

Ala Pro Cys Cys Val Pro Gln Ala Leu Glu Pro Leu Pro Ile Val Tyr
        355                 360                 365

Tyr Val Gly Arg Lys Pro Lys Val Glu Gln Leu Ser Asn Met Ile Val
    370                 375                 380

Arg Ser Cys Lys Cys Ser
385                 390

<210> SEQ ID NO 2
<211> LENGTH: 390
<212> TYPE: PRT
<213> ORGANISM: Rattus norvegicus

<400> SEQUENCE: 2

Met Pro Pro Ser Gly Leu Arg Leu Leu Pro Leu Leu Leu Pro Leu Pro
 1               5                  10                  15
```

Trp Leu Leu Val Leu Thr Pro Gly Arg Pro Ala Ala Gly Leu Ser Thr
            20                  25                  30

Cys Lys Thr Ile Asp Met Glu Leu Val Lys Arg Lys Ile Glu Ala
        35                  40                  45

Ile Arg Gly Gln Ile Leu Ser Lys Leu Arg Leu Ala Ser Pro Pro Ser
50                  55                  60

Gln Gly Glu Val Pro Pro Gly Pro Leu Pro Glu Ala Val Leu Ala Leu
65                  70                  75                  80

Tyr Asn Ser Thr Arg Asp Arg Val Ala Gly Glu Ser Ala Asp Pro Glu
                85                  90                  95

Pro Glu Pro Glu Ala Asp Tyr Tyr Ala Lys Glu Val Thr Arg Val Leu
            100                 105                 110

Met Val Asp Arg Asn Asn Ala Ile Tyr Asp Lys Thr Lys Asp Ile Thr
            115                 120                 125

His Ser Ile Tyr Met Phe Phe Asn Thr Ser Asp Ile Arg Glu Ala Val
        130                 135                 140

Pro Glu Pro Pro Leu Leu Ser Arg Ala Glu Leu Arg Leu Gln Arg Phe
145                 150                 155                 160

Lys Ser Thr Val Glu Gln His Val Glu Leu Tyr Gln Lys Tyr Ser Asn
                165                 170                 175

Asn Ser Trp Arg Tyr Leu Gly Asn Arg Leu Leu Thr Pro Thr Asp Thr
            180                 185                 190

Pro Glu Trp Leu Ser Phe Asp Val Thr Gly Val Val Arg Gln Trp Leu
        195                 200                 205

Asn Gln Gly Asp Gly Ile Gln Gly Phe Arg Phe Ser Ala His Cys Ser
210                 215                 220

Cys Asp Ser Lys Asp Asn Val Leu His Val Glu Ile Asn Gly Ile Ser
225                 230                 235                 240

Pro Lys Arg Arg Gly Asp Leu Gly Thr Ile His Asp Met Asn Arg Pro
                245                 250                 255

Phe Leu Leu Leu Met Ala Thr Pro Leu Glu Arg Ala Gln His Leu His
            260                 265                 270

Ser Ser Arg His Arg Arg Ala Leu Asp Thr Asn Tyr Cys Phe Ser Ser
        275                 280                 285

Thr Glu Lys Asn Cys Cys Val Arg Gln Leu Tyr Ile Asp Phe Arg Lys
290                 295                 300

Asp Leu Gly Trp Lys Trp Ile His Glu Pro Lys Gly Tyr His Ala Asn
305                 310                 315                 320

Phe Cys Leu Gly Pro Cys Pro Tyr Ile Trp Ser Leu Asp Thr Gln Tyr
            325                 330                 335

Ser Lys Val Leu Ala Leu Tyr Asn Gln His Asn Pro Gly Ala Ser Ala
            340                 345                 350

Ser Pro Cys Cys Val Pro Gln Ala Leu Glu Pro Leu Pro Ile Val Tyr
        355                 360                 365

Tyr Val Gly Arg Lys Pro Lys Val Glu Gln Leu Ser Asn Met Ile Val
            370                 375                 380

Arg Ser Cys Lys Cys Ser
385                 390

<210> SEQ ID NO 3
<211> LENGTH: 247
<212> TYPE: PRT
<213> ORGANISM: Griffonia simplicifolia

<400> SEQUENCE: 3

```
Asn Phe Trp Ser Asp Val Glu Asp Ser Ile Ile Phe Gln Gly Asp Ala
1               5                   10                  15
Asn Thr Thr Ala Gly Thr Leu Gln Leu Cys Lys Thr Asn Gln Tyr Gly
                20                  25                  30
Thr Pro Leu Gln Trp Ser Ala Gly Arg Ala Leu Tyr Ser Asp Pro Val
            35                  40                  45
Gln Leu Trp Asp Asn Lys Thr Glu Ser Val Ala Ser Phe Tyr Thr Glu
        50                  55                  60
Phe Thr Phe Phe Leu Lys Ile Thr Gly Asn Gly Pro Ala Asp Gly Leu
65                  70                  75                  80
Ala Phe Phe Leu Ala Pro Pro Asp Ser Asp Val Lys Asp Ala Gly Glu
                85                  90                  95
Tyr Leu Gly Leu Phe Asn Lys Ser Thr Ala Thr Gln Pro Ser Lys Asn
            100                 105                 110
Gln Val Val Ala Val Glu Phe Asp Thr Trp Thr Asn Pro Asn Phe Pro
        115                 120                 125
Glu Pro Ser Tyr Arg His Ile Gly Ile Asn Val Asn Ser Ile Val Ser
    130                 135                 140
Val Ala Thr Lys Arg Trp Glu Asp Ser Asp Ile Phe Ser Gly Lys Ile
145                 150                 155                 160
Ala Thr Ala Arg Ile Ser Tyr Asp Gly Ser Ala Glu Ile Leu Thr Val
                165                 170                 175
Val Leu Ser Tyr Pro Asp Gly Ser Asp Tyr Ile Leu Ser His Ser Val
            180                 185                 190
Asp Met Arg Gln Asn Leu Pro Glu Ser Val Arg Val Gly Ile Ser Ala
        195                 200                 205
Ser Thr Gly Asn Asn Gln Phe Leu Thr Val Tyr Ile Leu Ser Trp Arg
    210                 215                 220
Phe Ser Ser Asn Leu Gln Ser Thr Ser Val Lys Ala Ala Met Glu Pro
225                 230                 235                 240
Glu Ile Thr Arg Thr Val Val
                245

<210> SEQ ID NO 4
<211> LENGTH: 201
<212> TYPE: PRT
<213> ORGANISM: Homo sapiens

<400> SEQUENCE: 4

Met Ala Asn Lys Gly Pro Ser Tyr Gly Met Ser Arg Glu Val Gln Ser
1               5                   10                  15
Lys Ile Glu Lys Lys Tyr Asp Glu Glu Leu Glu Glu Arg Leu Val Glu
                20                  25                  30
Trp Ile Ile Val Gln Cys Gly Pro Asp Val Gly Arg Pro Asp Arg Gly
            35                  40                  45
Arg Leu Gly Phe Gln Val Trp Leu Lys Asn Gly Val Ile Leu Ser Lys
        50                  55                  60
Leu Val Asn Ser Leu Tyr Pro Asp Gly Ser Lys Pro Val Lys Val Pro
65                  70                  75                  80
Glu Asn Pro Pro Ser Met Val Phe Lys Gln Met Glu Gln Val Ala Gln
                85                  90                  95
Phe Leu Lys Ala Ala Glu Asp Tyr Gly Val Ile Lys Thr Asp Met Phe
            100                 105                 110
Gln Thr Val Asp Leu Phe Glu Gly Lys Asp Met Ala Ala Val Gln Arg
```

```
                  115                 120                 125
Thr Leu Met Ala Leu Gly Ser Leu Ala Val Thr Lys Asn Asp Gly His
    130                 135                 140

Tyr Arg Gly Asp Pro Asn Trp Phe Met Lys Lys Ala Gln Glu His Lys
145                 150                 155                 160

Arg Glu Phe Thr Glu Ser Gln Leu Gln Glu Gly Lys His Val Ile Gly
                165                 170                 175

Leu Gln Met Gly Ser Asn Arg Gly Ala Ser Gln Ala Gly Met Thr Gly
            180                 185                 190

Tyr Gly Arg Pro Arg Gln Ile Ile Ser
        195                 200

<210> SEQ ID NO 5
<211> LENGTH: 419
<212> TYPE: PRT
<213> ORGANISM: Homo sapiens

<400> SEQUENCE: 5

Met His Leu Leu Gly Phe Phe Ser Val Ala Cys Ser Leu Leu Ala Ala
1               5                   10                  15

Ala Leu Leu Pro Gly Pro Arg Glu Ala Pro Ala Ala Ala Ala Ala Phe
                20                  25                  30

Glu Ser Gly Leu Asp Leu Ser Asp Ala Glu Pro Asp Ala Gly Glu Ala
            35                  40                  45

Thr Ala Tyr Ala Ser Lys Asp Leu Glu Glu Gln Leu Arg Ser Val Ser
        50                  55                  60

Ser Val Asp Glu Leu Met Thr Val Leu Tyr Pro Glu Tyr Trp Lys Met
65                  70                  75                  80

Tyr Lys Cys Gln Leu Arg Lys Gly Gly Trp Gln His Asn Arg Glu Gln
                85                  90                  95

Ala Asn Leu Asn Ser Arg Thr Glu Glu Thr Ile Lys Phe Ala Ala Ala
                100                 105                 110

His Tyr Asn Thr Glu Ile Leu Lys Ser Ile Asp Asn Glu Trp Arg Lys
            115                 120                 125

Thr Gln Cys Met Pro Arg Glu Val Cys Ile Asp Val Gly Lys Glu Phe
        130                 135                 140

Gly Val Ala Thr Asn Thr Phe Phe Lys Pro Pro Cys Val Ser Val Tyr
145                 150                 155                 160

Arg Cys Gly Gly Cys Cys Asn Ser Glu Gly Leu Gln Cys Met Asn Thr
                165                 170                 175

Ser Thr Ser Tyr Leu Ser Lys Thr Leu Phe Glu Ile Thr Val Pro Leu
                180                 185                 190

Ser Gln Gly Pro Lys Pro Val Thr Ile Ser Phe Ala Asn His Thr Ser
            195                 200                 205

Cys Arg Cys Met Ser Lys Leu Asp Val Tyr Arg Gln Val His Ser Ile
        210                 215                 220

Ile Arg Arg Ser Leu Pro Ala Thr Leu Pro Gln Cys Gln Ala Ala Asn
225                 230                 235                 240

Lys Thr Cys Pro Thr Asn Tyr Met Trp Asn Asn His Ile Cys Arg Cys
                245                 250                 255

Leu Ala Gln Glu Asp Phe Met Phe Ser Ser Asp Ala Gly Asp Asp Ser
                260                 265                 270

Thr Asp Gly Phe His Asp Ile Cys Gly Pro Asn Lys Glu Leu Asp Glu
            275                 280                 285
```

-continued

```
Glu Thr Cys Gln Cys Val Cys Arg Ala Gly Leu Arg Pro Ala Ser Cys
290                 295                 300

Gly Pro His Lys Glu Leu Asp Arg Asn Ser Cys Gln Cys Val Cys Lys
305                 310                 315                 320

Asn Lys Leu Phe Pro Ser Gln Cys Gly Ala Asn Arg Glu Phe Asp Glu
                325                 330                 335

Asn Thr Cys Gln Cys Val Cys Lys Arg Thr Cys Pro Arg Asn Gln Pro
            340                 345                 350

Leu Asn Pro Gly Lys Cys Ala Cys Glu Cys Thr Glu Ser Pro Gln Lys
        355                 360                 365

Cys Leu Leu Lys Gly Lys Lys Phe His His Gln Thr Cys Ser Cys Tyr
    370                 375                 380

Arg Arg Pro Cys Thr Asn Arg Gln Lys Ala Cys Glu Pro Gly Phe Ser
385                 390                 395                 400

Tyr Ser Glu Glu Val Cys Arg Cys Val Pro Ser Tyr Trp Lys Arg Pro
                405                 410                 415

Gln Met Ser
```

<210> SEQ ID NO 6
<211> LENGTH: 21
<212> TYPE: DNA
<213> ORGANISM: Artificial Sequence
<220> FEATURE:
<223> OTHER INFORMATION: primer

<400> SEQUENCE: 6
ccaagctcac tgtgggagaa a                                        21

<210> SEQ ID NO 7
<211> LENGTH: 22
<212> TYPE: DNA
<213> ORGANISM: Artificial Sequence
<220> FEATURE:
<223> OTHER INFORMATION: primer

<400> SEQUENCE: 7
gctacttcca agggctcaat tc                                       22

<210> SEQ ID NO 8
<211> LENGTH: 21
<212> TYPE: DNA
<213> ORGANISM: Artificial Sequence
<220> FEATURE:
<223> OTHER INFORMATION: primer

<400> SEQUENCE: 8
ccaacgagta tggcagtgtc a                                        21

<210> SEQ ID NO 9
<211> LENGTH: 21
<212> TYPE: DNA
<213> ORGANISM: Artificial Sequence
<220> FEATURE:
<223> OTHER INFORMATION: primer

<400> SEQUENCE: 9
tgggttcagg cagtaatttg c                                        21

<210> SEQ ID NO 10
<211> LENGTH: 21
<212> TYPE: DNA
<213> ORGANISM: Artificial Sequence

```
<220> FEATURE:
<223> OTHER INFORMATION: primer

<400> SEQUENCE: 10
ccaacgagta tggcagtgtc a                                              21

<210> SEQ ID NO 11
<211> LENGTH: 26
<212> TYPE: DNA
<213> ORGANISM: Artificial Sequence
<220> FEATURE:
<223> OTHER INFORMATION: primer

<400> SEQUENCE: 11
actacaggcg gaaagctact aaaaac                                         26
```